(12) United States Patent
Fernandez Alonso et al.

(10) Patent No.: US 8,856,326 B2
(45) Date of Patent: Oct. 7, 2014

(54) ENHANCED MEDIA CONTROL

(75) Inventors: Susana Fernandez Alonso, Madrid (ES); David Castellanos Zamora, Madrid (ES); Jose Javier Pastor Balbás, Madrid (ES)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 655 days.

(21) Appl. No.: 12/525,225

(22) PCT Filed: Feb. 1, 2007

(86) PCT No.: PCT/EP2007/050977
§ 371 (c)(1),
(2), (4) Date: Feb. 1, 2010

(87) PCT Pub. No.: WO2008/092506
PCT Pub. Date: Aug. 7, 2008

(65) Prior Publication Data
US 2010/0131647 A1  May 27, 2010

(51) Int. Cl.
*G06F 15/173* (2006.01)
*H04W 12/08* (2009.01)
*H04L 29/06* (2006.01)
*H04L 29/08* (2006.01)
*H04W 84/00* (2009.01)

(52) U.S. Cl.
CPC ............ *H04L 67/306* (2013.01); *H04W 12/08* (2013.01); *H04L 63/102* (2013.01); *H04L 67/322* (2013.01); *H04W 84/00* (2013.01)
USPC ...................................................... 709/225

(58) Field of Classification Search
CPC ...... H04L 41/50; H04L 43/0894; H04L 65/80
USPC ................................................. 709/225, 226
See application file for complete search history.

(56) References Cited

U.S. PATENT DOCUMENTS

| | | | |
|---|---|---|---|
| 6,578,077 B1* | 6/2003 | Rakoshitz et al. | 709/224 |
| 7,043,241 B1* | 5/2006 | Sladek et al. | 455/432.3 |
| 2002/0075844 A1* | 6/2002 | Hagen | 370/351 |
| 2002/0089994 A1* | 7/2002 | Leach et al. | 370/412 |
| 2003/0103450 A1* | 6/2003 | Chapman et al. | 370/229 |
| 2005/0086388 A1 | 4/2005 | Boyle et al. | |
| 2005/0122930 A1* | 6/2005 | Zhao et al. | 370/328 |

(Continued)

FOREIGN PATENT DOCUMENTS

JP    2003-037821 A    2/2003

*Primary Examiner* — Jason Recek

(57) ABSTRACT

The present invention is aimed to provide an enhanced mechanism for conflict resolution between authorized services in respect of selective authorization criteria, such as service incompatibilities, subscribed bandwidth QoS assigned per subscriber and pre-emption priority value assigned per service. To this end, the present invention provides for a new method that allows the authorization of a subsequent service as a result of applying a selective authorization criterion for the subscriber at a policy control rules server to determine those previously authorized services to be put on hold, notifying about said previously authorized services to be on hold towards application devices handling such services, and inactivating at a policy enforcement device those control rules applicable to the media associated with said previously authorized services. In addition, the method as well as the policy control rules server, the application devices and the policy enforcement device may be also arranged for re-activating said previously authorized services still on hold when the reason for being on hold has ceased.

18 Claims, 11 Drawing Sheets

(56) References Cited

U.S. PATENT DOCUMENTS

| | | |
|---|---|---|
| 2007/0118659 A1* | 5/2007 | Cuny et al. .................... 709/227 |
| 2007/0207775 A1* | 9/2007 | Denenberg et al. ........... 455/406 |
| 2007/0233999 A1 | 10/2007 | Jerding et al. |
| 2008/0022359 A1* | 1/2008 | Gladstone et al. ................ 726/1 |
| 2008/0070697 A1 | 3/2008 | Robinson et al. |
| 2008/0098453 A1* | 4/2008 | Hinton et al. ..................... 726/1 |
| 2010/0202450 A1* | 8/2010 | Ansari et al. .................. 370/389 |

\* cited by examiner

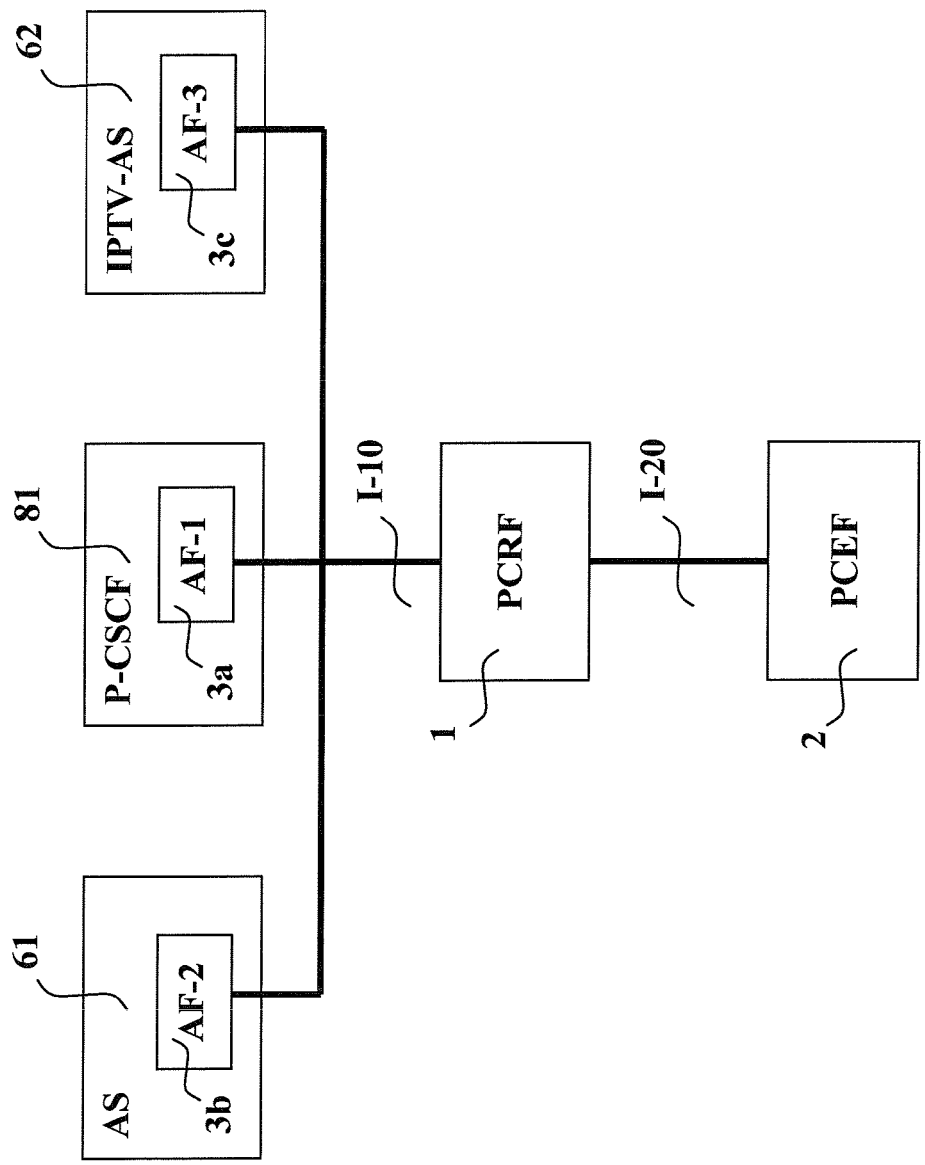
FIG.-1-

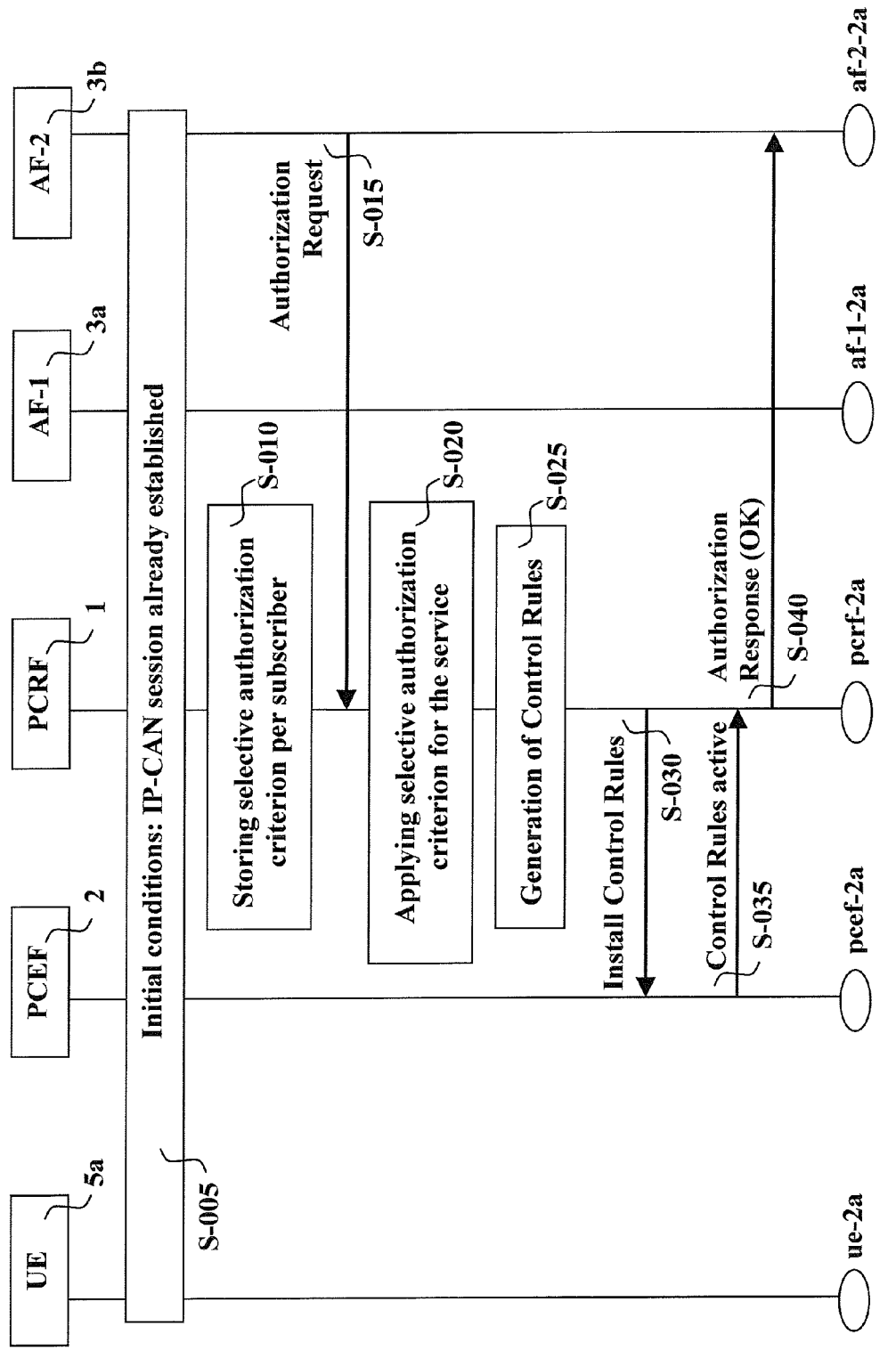
FIG.-2a-

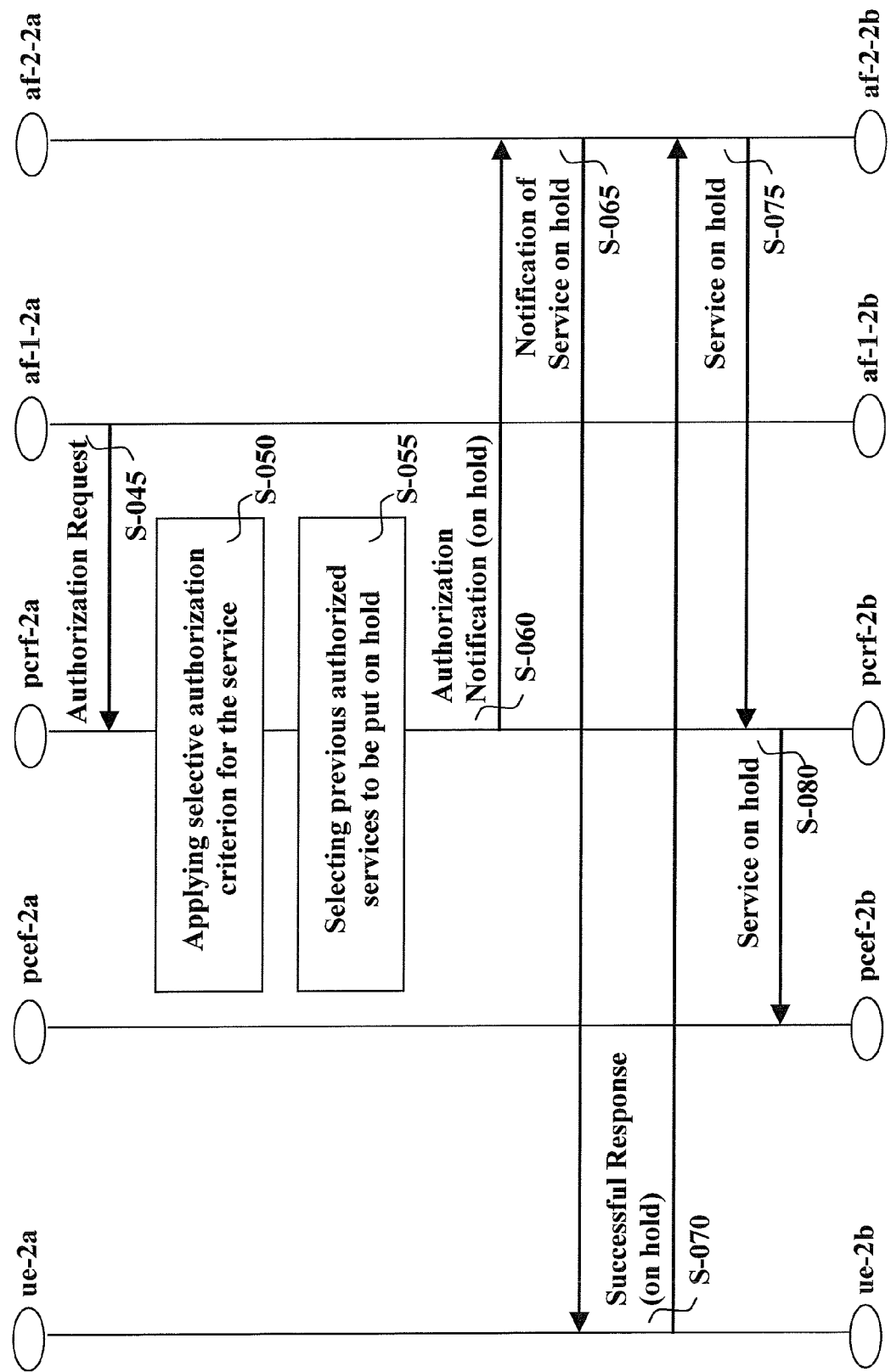
FIG.-2b-

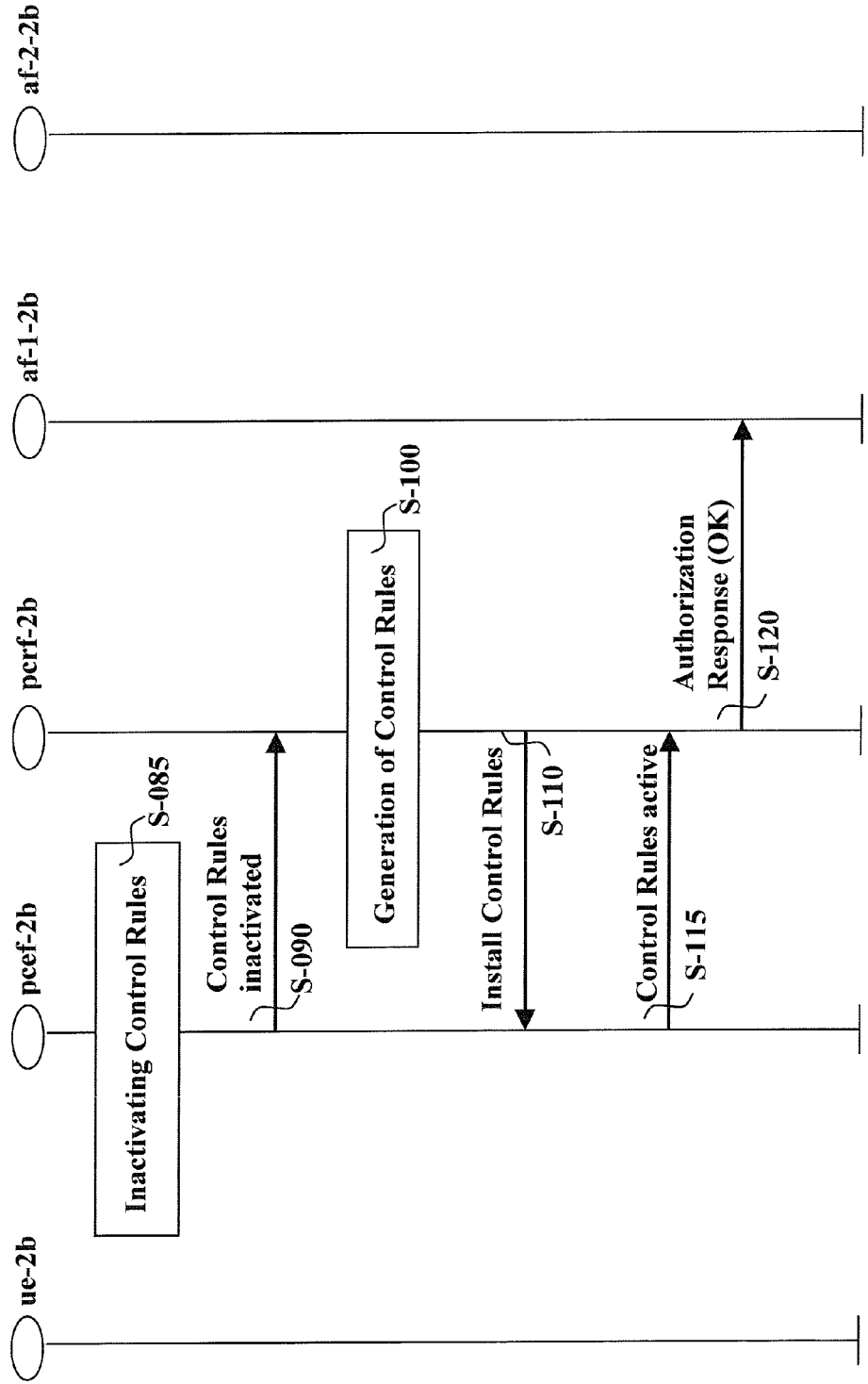
FIG.-2c-

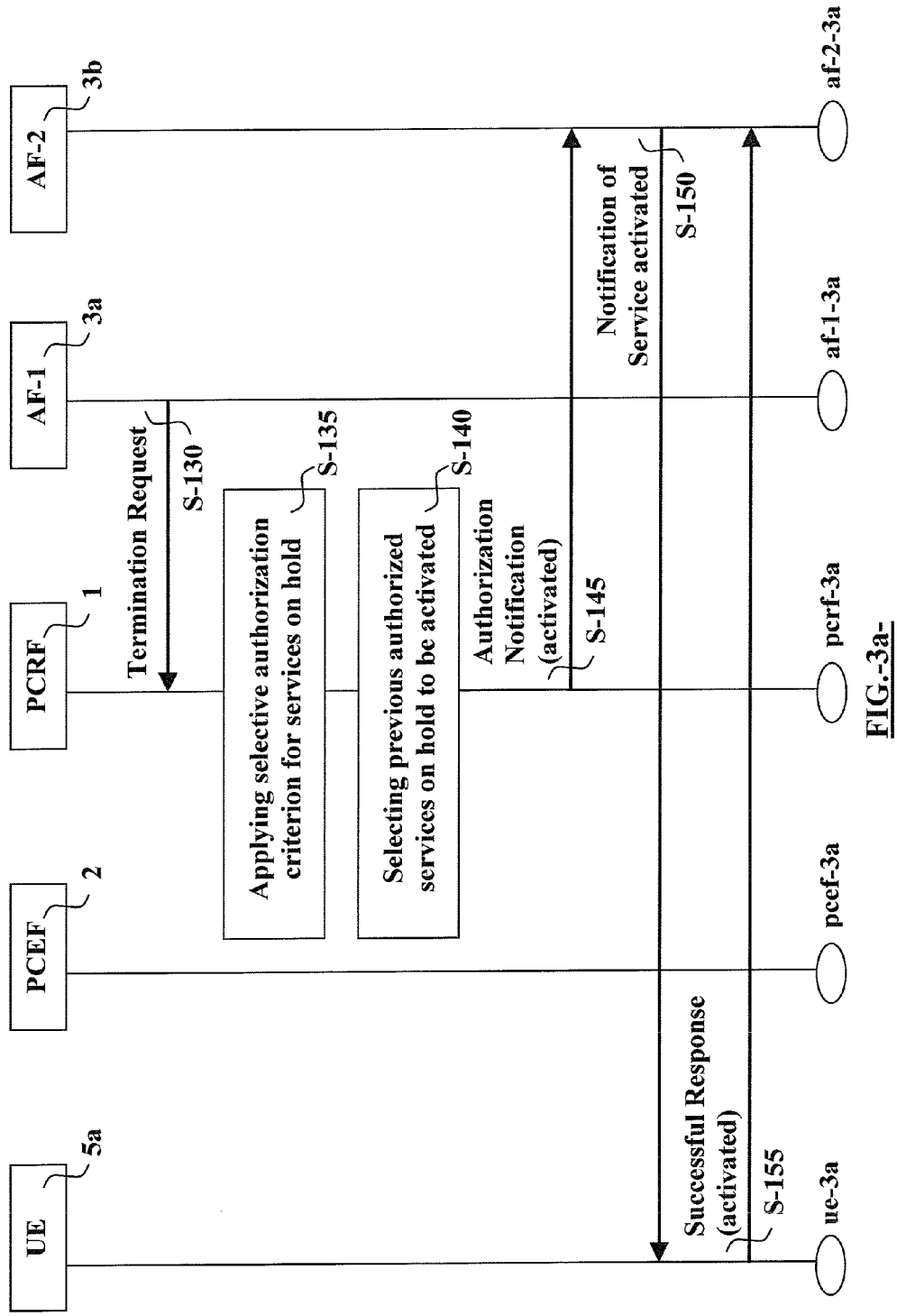
FIG.-3a-

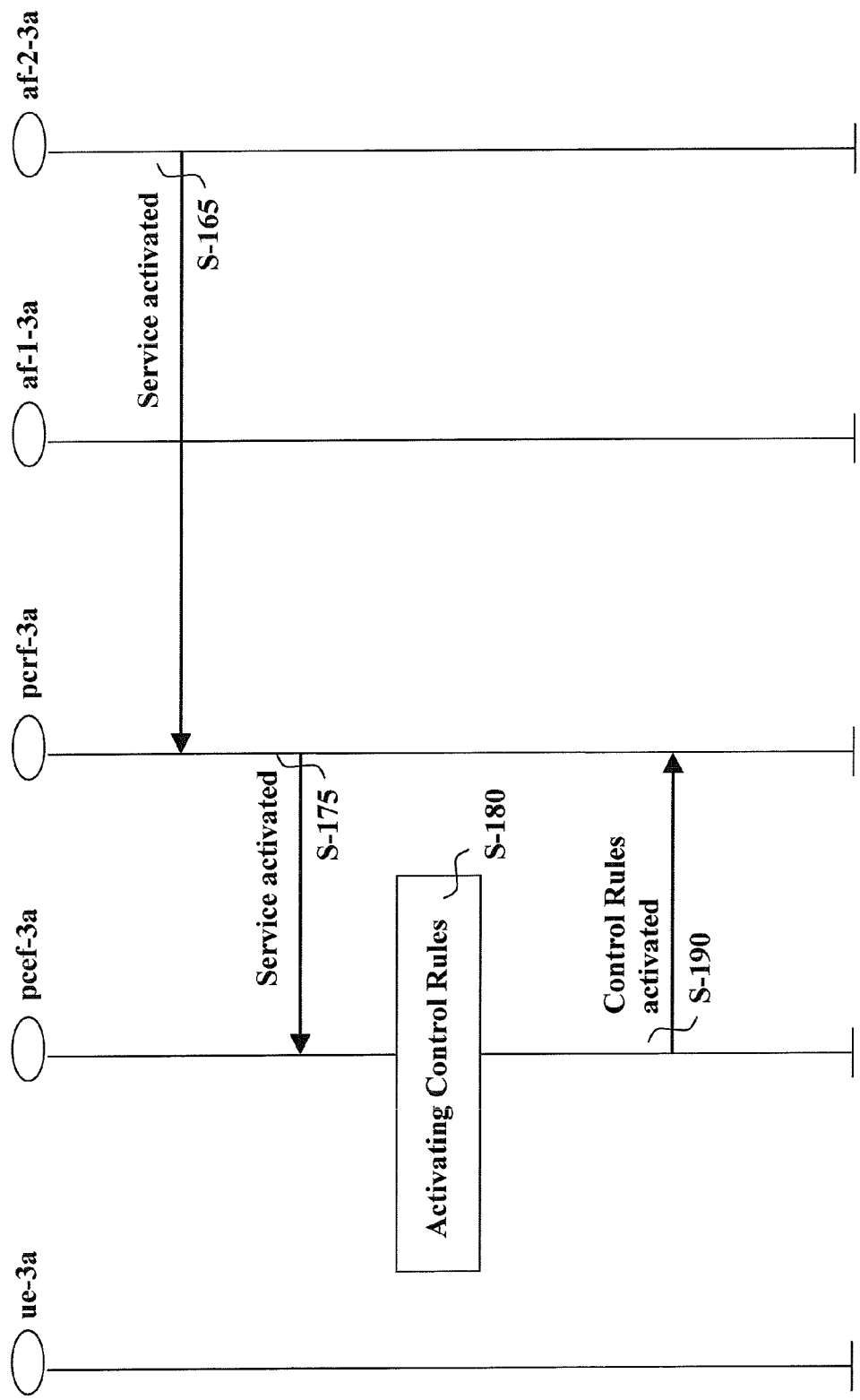
FIG.-3b-

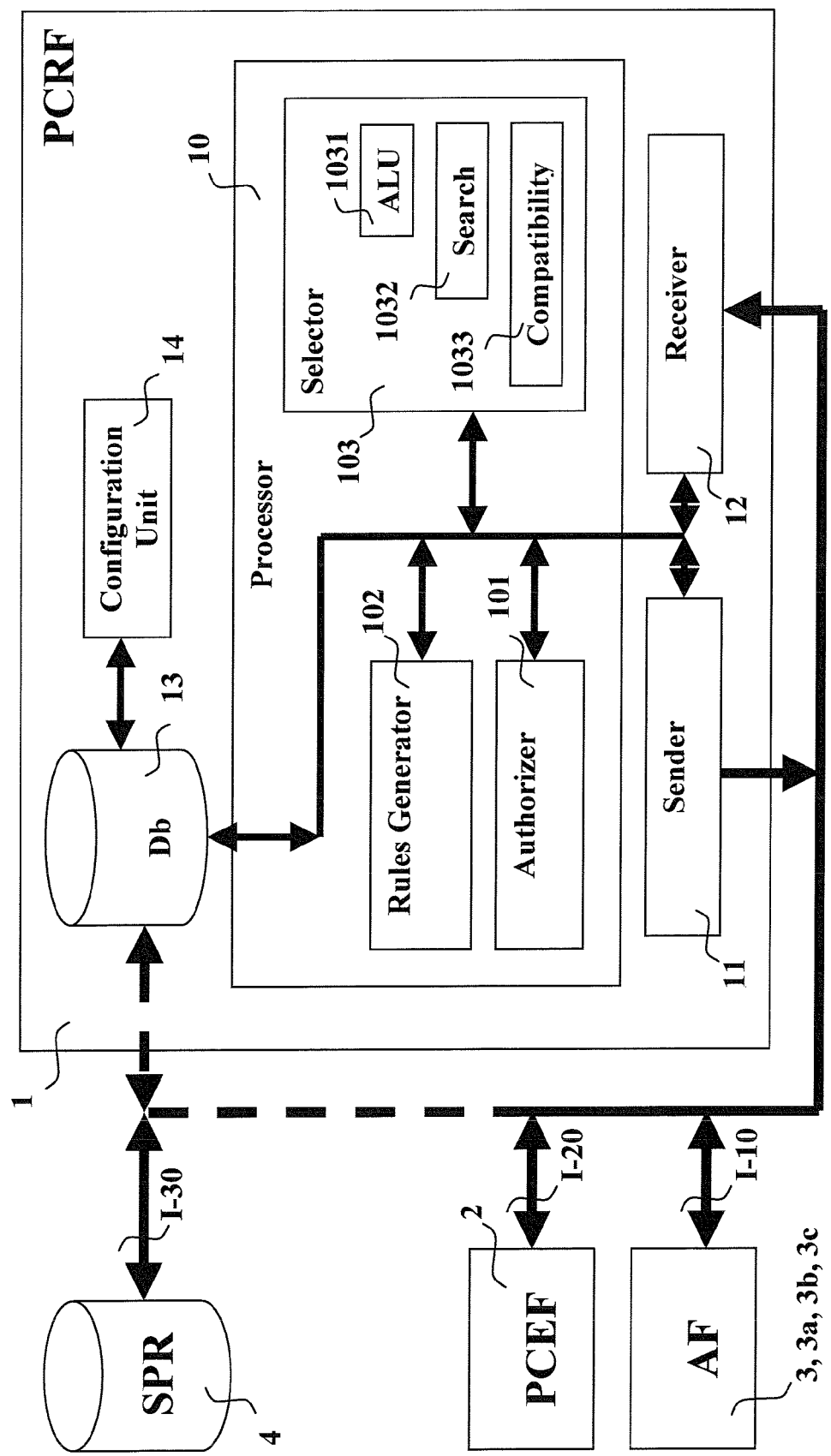
FIG.-4-

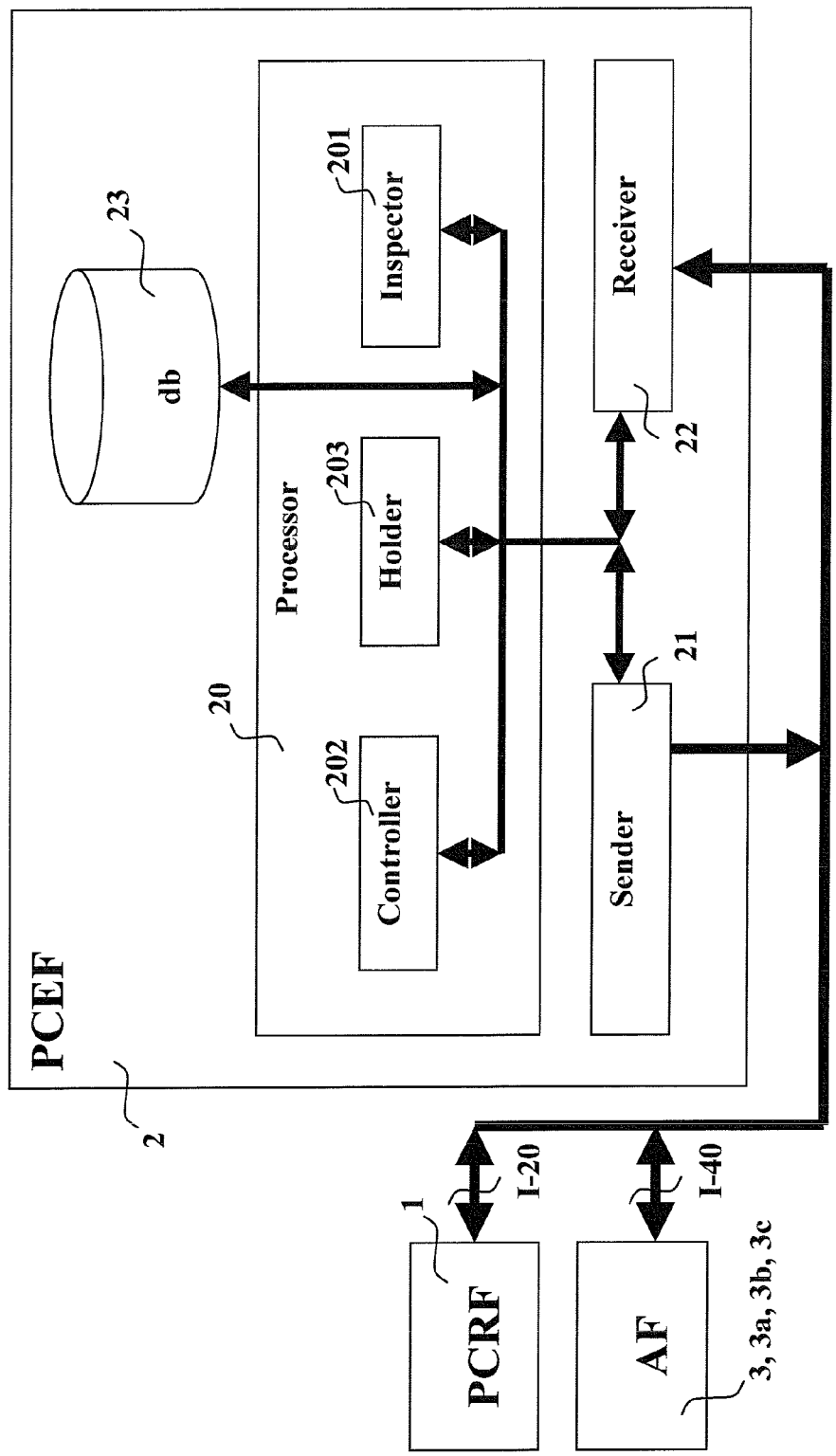
FIG.-5-

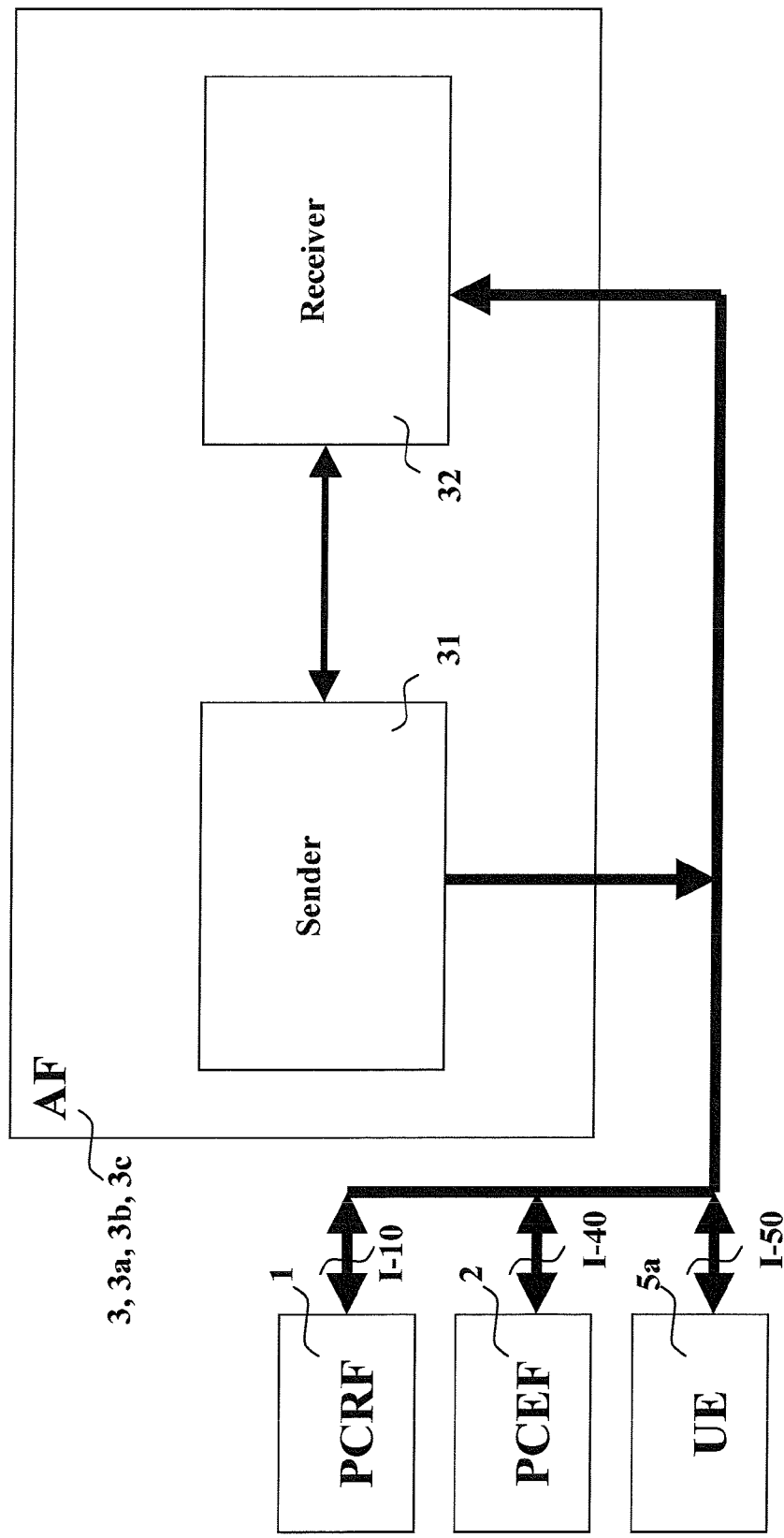
FIG.-6-

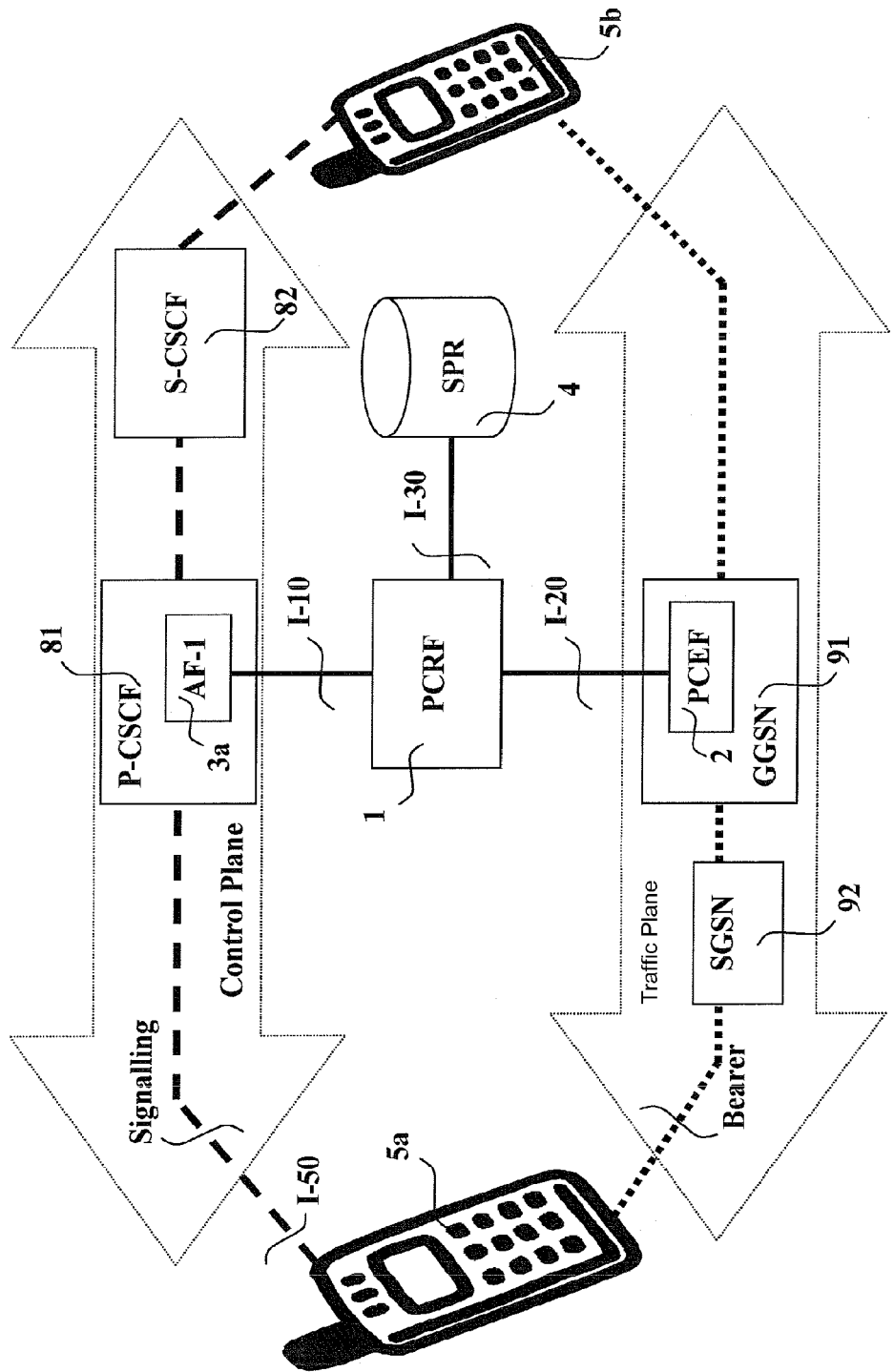
FIG.-7-

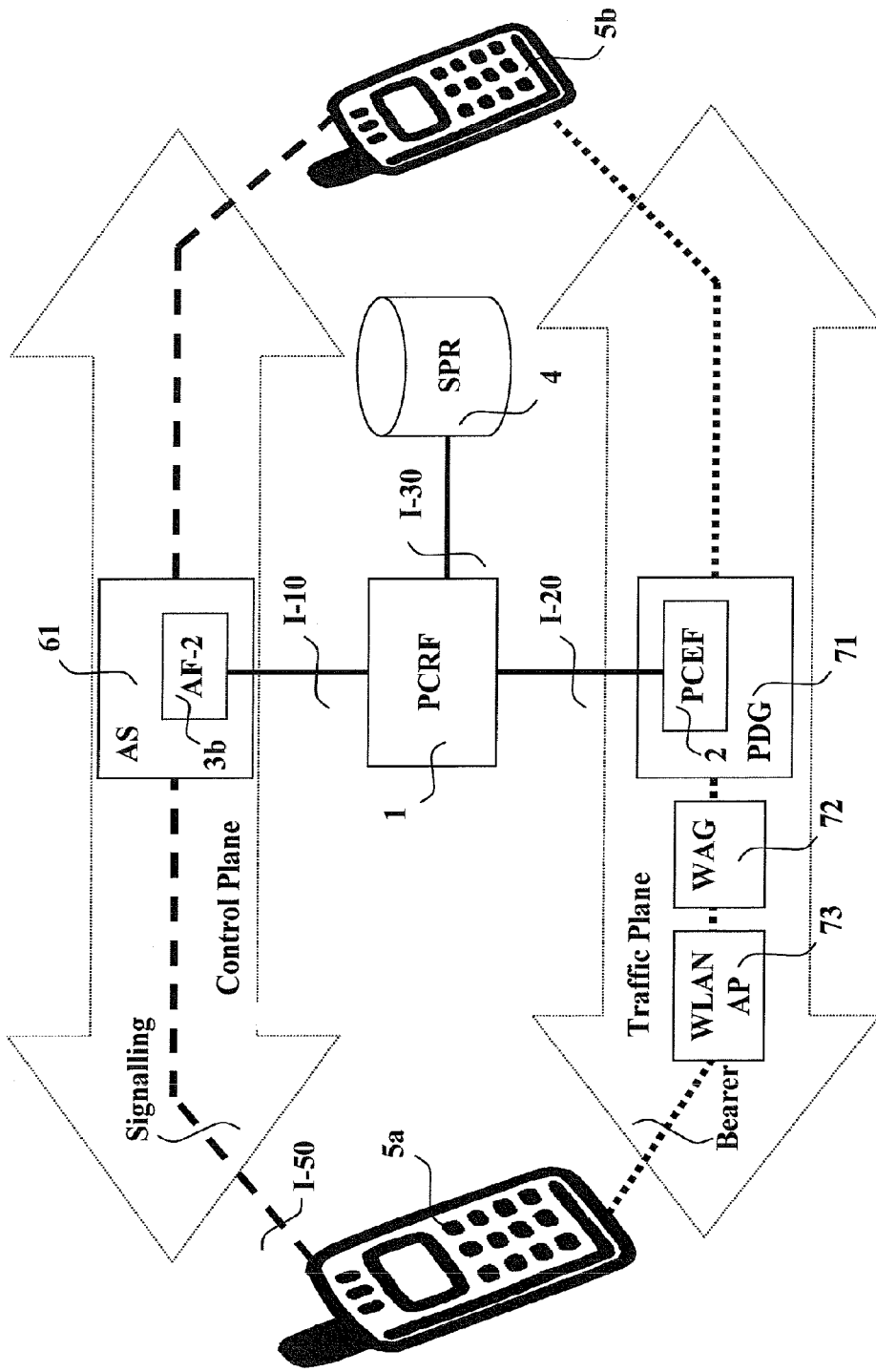
FIG.-8-

ENHANCED MEDIA CONTROL

TECHNICAL FIELD

The present invention generally relates to service requirements negotiated through a signalling layer, whereas said services are actually carried through a connectivity or bearer layer. In particular, the invention relates to the handling of available resources to fit those requirements on Quality of Service and, more specifically, those on required service bandwidth, negotiated for previous and subsequent services where different service priorities apply.

BACKGROUND

Nowadays, there are scenarios where a user with a user's equipment (hereinafter UE) can negotiate with a telecommunication network, via a signalling layer, service requirements such as quality of service (hereinafter QoS) and, more specifically, a required service bandwidth for a number of services, which are in fact carried through a separate bearer or connectivity layer provided by an access network. For the sake of simplicity, and given that the bandwidth required for a service may be usually indicated along with other parameters as QoS requirements, the term 'bandwidth QoS' is generally used throughout the present specification as referring to the bandwidth required for a service.

Amongst these scenarios, those providing an Internet Protocol (hereinafter IP) connectivity to users are particularly significant at present. In this context, the scenarios described throughout the present specification may include a so-called IP Connectivity Access Network (hereinafter IP-CAN) where the users can exchange IP packets through. More specifically, a bearer or connectivity layer is a media transport, capable of carrying a plurality of IP flows, and takes place at the traffic plane. An IP flow is a unidirectional flow of IP packets with the same source IP address and port number, the same destination IP address and port number and, likely, the same transport protocol. An IP flow is thus used to transmit IP packets between an origin and a destination. Each IP flow may be associated with a service, and several IP flows may be associated with the same service.

For instance, a first scenario may be one where the user negotiates service requirements, including a required bandwidth QoS, with an IP Multimedia Subsystem (hereinafter IMS), as specified in 3GPP TS 23.228 V7.6.0, whereas the services are actually carried through an IP-CAN such as a General Packet Radio Service (hereinafter GPRS) connectivity layer. In this first scenario, a Proxy Call Session Control Function (hereinafter P-CSCF) is an entry point to the IMS and is located in the signalling layer at the control plane, being thus aware of negotiated service requirements. On the other hand, the bearer layer in this first scenario is built up through a connection path established between the UE, a Serving GPRS Support Node (hereinafter SGSN), and a Gateway GPRS Support Node (hereinafter GGSN).

A second scenario may be one where the user negotiates service requirements with an application server (hereinafter AS), such as a streaming server for video download services or as an application server offering TV over an IP network (hereinafter IPTV-AS), whereas the services are actually carried through an IP-CAN such as a Wireless Local Area Network (hereinafter WLAN) connectivity layer. In this second scenario, the streaming server or the IPTV-AS are the entities in charge of negotiating the service requirements with the UE, and are located in the signalling layer at the control plane; whereas the bearer layer is built up through a connection path between the UE, a WLAN Access Point (hereinafter WLAN AP), a WLAN Access Gateway (hereinafter WAG), and a Packet Data Gateway (hereinafter PDG). New scenarios might be apparent by having different combinations of signalling layer at the control plane with bearer layer at the traffic plane.

On the other hand, a common architecture called Policy and Charging Control (hereinafter PCC) is currently developed under 3GPP TS 23.203 V7.1.0. This PCC is supposedly addressing all different types of access networks and is intended to control how media transported through the bearer layer is treated in view of corresponding service requirements negotiated through the signalling layer. In other words, the basic PCC architecture is suitable for being applied in scenarios where services are negotiated through the signalling layer, between user equipments and servers in the control plane; whereas said services are actually carried through the connectivity or bearer layer, possibly between originating and destination user equipments.

In accordance with the above 3GPP TS 23.203, the PCC architecture includes a so-called Policing and Charging Rules Function (hereinafter PCRF) in charge of defining network control for detection of particular IP flows associated with a given service, making decisions based on information received from the signalling layer by generating control rules to enforce the negotiated service requirements into the bearer layer, as well as notifying the service layer about significant events occurred in the bearer layer for a given service. In particular, these control rules may include policy rules and charging rules. This PCRF is preferably located in an intermediate entity enabled to communicate with a first entity in the control plane and with a second entity in the traffic plane. The PCC architecture also includes a so-called Policing and Charging Enforcement Function (hereinafter PCEF) in charge of detecting those particular IP flows associated with a given service, and enforcement at the bearer layer of those service requirements negotiated through the signalling layer by installing the above control rules received from the PCRF. The PCEF may be included in the traffic plane and supports the connectivity or bearer layer between originating and destination user equipments, or between application servers and user equipments. Apart from the PCRF and PCEF, the PCC architecture also includes an application function (hereinafter AF) for offering applications that require control of the IP bearer resources. In particular, the AF may reside in, or be an integral part of, a server in the control plane aware of negotiated service requirements. The AF communicates with the PCRF to transfer dynamic session information, namely service information including the negotiated service requirements, required for PCRF decisions and for generation of the control rules.

Regarding the above exemplary scenarios, and prior to registering a user in an application at the control plane such as the IMS or an appropriate application server, namely at the signalling layer, the user has to establish a bearer through the IP-CAN, that is, at the bearer layer. The establishment of a first bearer for a user through the IP-CAN implies the establishment of an IP-CAN session, and subsequent bearers may further be established for the user in said IP-CAN session. In particular, where the IP-CAN is a GPRS access network and the user intends to register into an IMS network, the user has to firstly activate a primary Packet Data Protocol (hereinafter PDP) Context through the GPRS access network for bearing the IMS signalling. Once this primary PDP Context has been activated, there is an active IP-CAN session for the user wherein further secondary PDP contexts may be subsequently activated. An IMS network generally makes use of a Session Initiation Protocol (hereinafter SIP) so that, for the purpose of the present discussion, IMS signalling is conventionally understood as SIP signalling. Likewise, the establishment of a bearer through the IP-CAN is understood as the activation of a primary PDP Context in scenarios having a GPRS access network as IP-CAN. Then, once the user has established a bearer through the IP-CAN, the user can register in the application at the control plane and can negotiate with the exemplary IMS, or with the exemplary AS, or with a destination user the service requirements to be applied to the transmission of media through the bearer layer.

Once the QoS requirements for a service, including the bandwidth QoS, have been negotiated, the traditional PCC architecture may be used to ensure the control of network resources. To this end, an AF located in the control plane and aware of negotiated service requirements for a service submits an authorization request message towards the PCRF that, based on received IP-CAN session information and specific policies, generates control rules to be downloaded to a PCEF located in the traffic plane and supporting the connectivity or bearer layer. Such control rules permit, amongst others, the assignation of resources in a proper way.

Nowadays, and in order to better using and administering network resources in teems of bandwidth QoS, each network subscriber is assigned a so-called 'subscribed bandwidth QoS' intended to limit on subscription basis the total bandwidth consumed by those services already authorized for a subscriber. In addition, each individual service such as Push To-Talk "PTT", Mobile Multimedia Telephony "MMTel" or 'Streaming' is assigned a so-called 'pre-emption priority value' intended to determine those services previously authorized with lower priority than a subsequent service as part of a conflict resolution mechanism to be applied where the total bandwidth consumed by the previous and the subsequent services would exceed the assigned 'subscribed bandwidth QoS' for the subscriber. In accordance with the conflict resolution mechanism as currently specified for PCC, the pre-emption of those services with lower 'pre-emption priority value' allows the execution of other subsequent services with higher 'pre-emption priority value'.

For instance, where a low priority Streaming service served by an IPTV-AS does not allow the execution of a higher priority service, such as an MMTel call, to be accepted due to the lower priority streaming service consuming all or most of the available resources for that subscriber, this pre-emption priority mechanism for conflict resolution allows the higher priority MMTel call to be served in detriment of the lower priority streaming service.

However, at the current deployment of the pre-emption priority mechanism for conflict resolution, there is no clear suggestion of what actions should be carried out for allowing the higher priority MMTel call to be served, and what actions should be carried out in detriment of the lower priority streaming service. By disregarding or disabling the control rules installed at the PCEF and corresponding to the lower priority services, one may infer that such sort of event, as other events detected on the traffic plane, might be reported from the PCEF towards the AF via the PCRF. The AF would not have other choice than terminating the service. On the other hand, given that the PCC architecture today is only expected to authorize or de-authorize a service from the PCRF towards the AF, one might also infer that the PCRF should de-authorize previously authorized services with lower pre-emption priority towards the AF in charge of such previous services and order de-installation of corresponding control rules towards the PCEF prior to authorizing subsequent services with higher pre-emption priority towards the AF in charge of such subsequent service and order installation of corresponding control rules towards the PCEF.

On the other hand, user experience would be that, with the current deployment of the pre-emption priority mechanism for conflict resolution, some services previously running have been disconnected or are malfunctioning without any apparent reason to justify it.

SUMMARY

The present invention is aimed to obviate at least some of the above disadvantages and provide an enhanced mechanism for conflict resolution in respect of subscribed bandwidth QoS assigned per subscriber and pre-emption priority value assigned per service.

Moreover, the above pre-emption priority mechanism may provide conflict resolution where the subscribed bandwidth QoS is exceeded. However, other conflict situations are not discussed at all. For instance, service incompatibility between different services is neither treated nor suggested in the above mechanism for conflict resolution, and these service incompatibilities may a significant influence where the services concerned are assigned a different pre-emption priority value, i.e. two services that cannot run in parallel and one has a higher priority than the other.

The present invention is thus aimed to also enhance the above mechanism for conflict resolution in order to, at least, mitigate the expected impacts from applying service incompatibilities whilst taking into account a subscribed bandwidth QoS assigned per subscriber and a pre-emption priority value assigned per service.

The above objects are generally accomplished in accordance with the invention by providing an enhanced method for guaranteeing in a policy enforcement device, which is in charge of controlling media through a bearer layer, those service requirements negotiated for a number of services through application devices, which are in charge of handling said services at a signalling layer, the service requirements including a bandwidth Quality of Service "QoS" for the media associated with each service; this method been applied amongst the policy enforcement device located at the bearer layer, the application devices located at the signalling layer and a policy control rules server responsible for generating control rules based on service information received from the application devices and for installing said control rules in the policy enforcement device.

Thus, in accordance with a first aspect of the present invention, there is provided a method for conflict resolution where a subsequent service cannot be executed whilst other previously authorized services are running. This method comprises a step of storing in storage accessible to the policy control rules server a selective authorization criterion per subscriber, the selective authorization criterion being selectable from a group of selective authorization criteria that includes: service incompatibilities, subscribed bandwidth QoS per subscriber, pre-emption priority value per each service allowable for each subscriber, and combinations thereof.

Then, the method includes a step of receiving at the policy control rules server, a number of previous service authorization requests followed by a subsequent service authorization request for a subscriber from application devices, each service authorization request respectively including service information indicating associated media and bandwidth QoS required for the associated media.

This method includes a step of generating respective control rules for the previous and subsequent service authorization requests; a step of installing said respective control rules at the policy enforcement device; and a step of submitting towards the application devices respective authorization responses for the previous and subsequent service authorization requests.

In order to provide a conflict resolution that allows the execution of the subsequent service, and thus the steps of generating and installing rules for the subsequent service authorization request as well as the step of submitting corresponding authorization response for the subsequent service, this method includes a step of selecting, amongst the previously authorized services at the policy control rules server, those which may be inactivated as a result of applying the selective authorization criterion for the subscriber; a step of putting on hold these selected one or more previously authorized services; a step of submitting from the policy control rules server towards the application devices a notification indicating those selected one or more previously authorized services to be put on hold; a step of receiving at the policy enforcement device a notification intended to put on hold respective control rules for the one or more previously authorized services; and a step of inactivating at the policy enforcement device those control rules applicable to the media associated with said one or more previously authorized services.

In this method, the step of receiving at the policy enforcement device the notification intended to put on hold respective control rules for the one or more previously authorized services may include a step of submitting such notification from the application devices or from the policy control rules server towards the policy enforcement device. In addition, the method may further comprise a step of receiving at the policy control rules server from each application device a confirmation intended to put on hold the selected one or more previously authorized services. In particular, the notification submitted from the policy control rules server towards the policy enforcement device may be responsive to this confirmation.

Regarding different combinations that a particular selective authorization criterion may consist of, for one combination the step of selecting amongst the previously authorized services those which may be inactivated may include a step of determining a cumulative bandwidth QoS as the total sum of bandwidth QoS consumed by the media associated with the previously authorized services plus the bandwidth QoS required for the subsequent service, the cumulative bandwidth QoS exceeding the subscribed bandwidth QoS; and a step of fetching amongst the previously authorized services those with lower pre-emption priority value than the subsequent service and, amongst these, those which consumed bandwidth QoS, discounted alone or in combination from the cumulative bandwidth QoS, make the cumulative bandwidth QoS lower than the subscribed bandwidth QoS for the subscriber. For another combination, the step of selecting amongst the previously authorized services those which may be inactivated may include a step of determining amongst the previously authorized services those having service incompatibilities in the selective authorization criterion.

On the other hand, the method may include alternative steps terminating the reasons to put on hold previously authorized services. Thus, the method may further include a step selectable from increasing the subscribed bandwidth QoS for the subscriber; terminating an authorized service, other than the previously authorized services still on hold; and both of them.

Upon occurrence of at least one of the above steps terminating the reasons to put on hold previously authorized services, the method may further include: a step of selecting at the policy control rules server, amongst the previously authorized services still on hold, those which may be activated as a result of applying the selective authorization criterion for the subscriber; a step of submitting towards the application device a notification indicating the selected one or more previously authorized services, still on hold, to be activated; a step of activating at the policy control rules server and at the application device these selected one or more previously authorized services still on hold; a step of receiving at the policy enforcement device a notification intended to activate respective control rules for the selected one or more previously authorized services still on hold; and a step of activating at the policy enforcement device those control rules applicable to the media associated with said selected one or more previously authorized services.

For similar reasons as for selecting previously authorized services to be put on hold, and regarding the different combinations that a particular selective authorization criterion may consist of, for one combination the step of selecting amongst the previously authorized services on hold those which may be activated includes a step of determining a cumulative bandwidth QoS as the total sum of bandwidth QoS consumed by the media associated with currently authorized services, other than the previously authorized services still on hold, the subscribed bandwidth QoS exceeding the cumulative bandwidth QoS; and a step of fetching amongst the previously authorized services still on hold those with higher pre-emption priority value and, amongst these, those which consumed bandwidth QoS, added alone or in combination to the cumulative bandwidth QoS, still make the cumulative bandwidth QoS lower than the subscribed bandwidth QoS for the subscriber. However, for another combination the step of selecting amongst the previously authorized services on hold those which may be activated includes a step of determining amongst the previously authorized services still on hold those which may be activated as a result of applying service incompatibilities in the selective authorization criterion.

In accordance with a second aspect of the present invention, there is provided a policy control rules server for generating control rules based on service information received from application devices and for installing said control rules in a policy enforcement device responsible for guaranteeing a bandwidth Quality of Service "QoS" for media associated with authorized services.

This policy control rules server includes a receiver arranged for receiving from application devices a number of previous service authorization requests and a subsequent service authorization request for a subscriber, each service authorization request respectively indicating associated media and bandwidth QoS required for the associated media; an authorizer for authorizing the previous and subsequent service authorization requests; a rules generator for generating control rules for the previous and subsequent service authorization requests respectively; and a sender arranged for submitting towards the application devices respective authorization responses for the previous and subsequent service authorization requests, and for submitting towards a policy enforcement device respective control rules.

In order to effectively contribute to the above conflict resolution, the policy control rules server may include storage for storing a selective authorization criterion per subscriber, the selective authorization criterion being selectable from a group of selective authorization criteria including: service incompatibilities, subscribed bandwidth QoS per subscriber, pre-emption priority value per each service allowable for each subscriber, and combinations thereof; and a selector for selecting amongst the previously authorized services those which may be inactivated as a result of applying the selective authorization criterion for the subscriber. Apart from that, in this policy control rules server, the authorizer may be arranged for putting on hold the selected previously authorized services and the sender may be arranged for submitting towards the respective application device a notification indicating those selected previously authorized services to be put on hold.

In order to accomplish different alternatives of the above method, the policy control rules server may be configured so that its sender may be arranged for submitting towards the policy enforcement device a notification intended to put on hold respective control rules for those selected previously authorized services; its receiver may be arranged for receiving from the application devices a confirmation intended to put on hold the selected previously authorized services; and, where sender and receiver are arranged to this end, the notification submitted from the sender towards the policy enforcement device may be responsive to the confirmation received from the application devices intended to put on hold the selected previously authorized services.

Regarding the different combinations that a particular selective authorization criterion may consist of, the selector may include an arithmetical unit for determining a cumulative bandwidth QoS as the total sum of bandwidth QoS consumed by the media associated with the previously authorized services plus the bandwidth QoS required for the subsequent service, the cumulative bandwidth QoS exceeding the subscribed bandwidth QoS; and search means for fetching amongst the previously authorized services those with lower pre-emption priority value than the subsequent service and, amongst these, those which consumed bandwidth QoS, discounted alone or in combination from the cumulative bandwidth QoS, make the cumulative bandwidth QoS lower than the subscribed bandwidth QoS for the subscriber. Alternatively, or in addition, the selector may include a compatibility module for determining amongst the previously authorized services those having service incompatibilities in the selective authorization criterion.

Regarding the selective authorization criteria, the receiver of the policy control rules server may be arranged for receiving from a subscription profile repository "SPR", which holds subscription information for subscribers of a telecommunication network, either the selective authorization criterion, or any selective authorization criteria selectable from: service incompatibilities, subscribed bandwidth QoS per subscriber, pre-emption priority value per each service allowable for each subscriber, and combinations thereof.

On the other hand, where the stored subscribed bandwidth QoS is increased for a subscriber in the policy control rules server, the selector may be further arranged for selecting, amongst the previously authorized services still on hold, those which may be activated as a result of applying the selective authorization criterion for the subscriber; the authorizer may be further arranged for activating these selected previously authorized services still on hold; and the sender may be further arranged for submitting towards the application device a notification indicating said selected previously authorized services, still on hold, to be activated. In an embodiment of the invention, the selector may include the arithmetical unit for determining a cumulative bandwidth QoS as the total sum of bandwidth QoS consumed by the media associated with currently authorized services, other than the previously authorized services still on hold, the subscribed bandwidth QoS exceeding the cumulative bandwidth QoS; and the search means for fetching amongst the previously authorized services still on hold those with higher pre-emption priority value and, amongst these, those which consumed bandwidth QoS, added alone or in combination to the cumulative bandwidth QoS, still make the cumulative bandwidth QoS lower than the subscribed bandwidth QoS for the subscriber. In another embodiment, which may be combinable with the preceding one, this selector may include the compatibility module for determining amongst the previously authorized services still on hold those which may be activated as a result of applying service incompatibilities in the selective authorization criterion.

In an embodiment, the sender in this policy control rules server may be further arranged for submitting towards the policy enforcement device a notification indicating respective control rules for said selected previously authorized services, still on hold, to be activated.

In accordance with a third aspect of the present invention, there is provided a policy enforcement device for installing control rules received from the policy control rules server in order to guarantee a bandwidth Quality of Service "QoS" for media associated with authorized services.

This policy enforcement device includes a receiver arranged for receiving from the policy control rules server control rules to apply for media associated with an authorized service, the control rules indicating the associated media and bandwidth QoS required for the associated media; storage for storing a number of control rules to be respectively applied to the media associated with a number of authorized services; an inspector for distinguishing media transported in a bearer per authorized service basis; and a controller for applying the control rules applicable to each media and for controlling the bandwidth QoS consumed by each media. In order to effectively contribute to the above conflict resolution, this policy enforcement device may also include a holder for inactivating those control rules applicable to the media associated with said one or more previously authorized services, and the receiver in this policy enforcement device may be arranged for receiving a notification intended to put on hold respective control rules for one or more previously authorized services. In particular, the holder may be arranged for keeping the inactivated control rules in the storage.

Particularly advantageous for some alternative steps in the above method, the receiver of this policy enforcement device may be arranged for receiving the notification intended to put on hold respective control rules for one or more previously authorized services from the policy control rules server or from an application device.

Regarding the activation of control rules, the receiver of the policy enforcement device may be arranged for receiving from the policy control rules server or from the application device a notification intended to activate respective control rules for one or more previously authorized services still on hold; and the holder may be arranged for activating these respective control rules applicable to the media associated with said one or more previously authorized services.

Moreover, regarding the termination of control rules to apply, the receiver of the policy enforcement device may be also arranged for receiving from the policy control rules server a service termination request intended to terminate the control rules for the authorized service, on hold or activated; and the controller may be further arranged for removing the corresponding control rules from storage, for releasing those resources consumed by the terminated service, and for terminating the transporting bearer once no corresponding control rule remains in the storage.

In accordance with a fourth aspect of the present invention, there is provided an application device for submitting towards the policy control rules server service information for a service that require control of bearer resources. This application device includes a sender arranged for submitting towards a policy control rules server a number of previous service authorization requests and a subsequent service authorization request for a subscriber, each service authorization request respectively indicating associated media and bandwidth QoS required for the associated media; and a receiver arranged for receiving from the policy control rules server authorization responses for the previous and subsequent service authorization requests.

In order to effectively contribute to the above conflict resolution, this application device may be adapted so that its receiver is further arranged for receiving from the policy control rules server a notification indicating one or more previously authorized services to be put on hold; and its sender is arranged for submitting either a confirmation towards the policy control rules server intended to put on hold the one or more previously authorized services, or a notification towards the policy enforcement device intended to put on hold respective control rules for the one or more previously authorized services, or both confirmation and notification.

In particular, the confirmation submitted towards the policy control rules server may be responsive to a successful response from a user's equipment usable by the subscriber. To this end, the application device may be configured so that its sender is thus further arranged for submitting towards the user's equipment a notification indicating the one or more previously authorized services to be put on hold; and its receiver is thus further arranged for receiving from the user's equipment the corresponding successful response.

Regarding the termination of reasons that caused services to be on hold, the receiver of the application device may be further arranged for receiving from the policy control rules server a notification indicating the one or more previously authorized services, still on hold, to be activated; and, where configured to this end, the sender of the application device may be further arranged for submitting towards the policy control rules server a confirmation indicating the one or more previously authorized services, still on hold, to be activated.

Alternative or in addition to this confirmation, the sender of the application device may be also arranged for submitting towards the policy enforcement device a notification intended to activate respective control rules for the one or more previously authorized services still on hold.

Where such confirmation submitted towards the policy control rules server or where such notification submitted towards the policy enforcement device is responsive to a successful response from the user's equipment usable by the subscriber; the sender of the application device may be arranged for submitting towards the user's equipment a notification indicating the one or more previously authorized services still on hold and to be activated; and the receiver of the application device may be arranged for receiving from the user's equipment the corresponding successful response.

Apart from that, the sender of the application device may be further arranged for submitting towards the policy control rules server a termination request intended to terminate any authorized service, on hold or activated.

In accordance with a fifth aspect of the present invention, there is provided a user equipment usable by a subscriber of a telecommunication network better adapted to receive information interpretable as part of the conflict resolution. This user equipment includes means for negotiating service requirements for a service through an application device, wherein the service requirements include a bandwidth Quality of Service "QoS" for media associated with the service, and also includes a receiver arranged for receiving from an application device a notification indicating one or more previously authorized services to be put on hold whilst a subsequent service is running, and a sender arranged for submitting towards the application device a corresponding successful response.

BRIEF DESCRIPTION OF THE DRAWINGS

The features, objects and advantages of the invention will become apparent by reading this description in conjunction with the accompanying drawings, in which:

FIG. 1 is a basic block diagram illustrating how different entities provided for by the present invention may fit into a PCC architecture cooperating with a P-CSCF of an IMS network as well as with different Application Services where services are executed for a user.

FIGS. 2a, 2b and 2c illustrate a sequence diagram of an exemplary method that can be applied for conflict resolution, where previously authorized services are put on hold to allow the authorization of a subsequent service.

FIGS. 3a and 3b illustrate a sequence diagram of another exemplary method that can be applied for completing a conflict resolution, where previously authorized services still on hold may be activated once the reasons causing the conflict have ceased.

FIG. 4 is a basic block structure presenting the structural elements that a policy control rules server may comprise in accordance with several embodiments of the invention.

FIG. 5 is a basic block structure presenting the structural elements that a policy enforcement device may comprise in accordance with several embodiments of the invention.

FIG. 6 is a basic block structure presenting the structural elements that an application device may comprise in accordance with several embodiments of the invention.

FIG. 7 is a basic block diagram illustrating how the invention fits in a first scenario following a PCC model, where requirements on QoS are negotiated through an IMS signalling layer whilst services are carried on a bearer layer provided by a GPRS access network.

FIG. 8 is a basic block diagram illustrating how the invention fits in a second scenario following a PCC model, where requirements on QoS are negotiated through a generic signalling layer whilst services are carried on a bearer layer provided by a WLAN access network.

DETAILED DESCRIPTION

The following describes some preferred embodiments for an enhanced mechanism for conflict resolution in respect of subscribed bandwidth QoS assigned per subscriber, pre-emption priority value assigned per service, service incompatibilities and combinations thereof.

FIGS. 2a, 2b and 2c illustrate an exemplary method that can be applied for the above conflict resolution, wherein not all steps are essential but advantageous in order accomplish optional or alternative enhancements further described. This method might be carried out with participation of a PCC architecture enhanced in accordance with aspects of the present invention. The sequence of actions in FIG. 2a starts with an initial condition of having already established an IP-CAN session for the user in step S-005, which particular details are well-known for those skilled in the art and, since are not relevant for the purpose of the present invention, are not further detailed.

At this stage, and if not previously carried out through a still previous step of configuration not shown in any drawing, the invention provides for a step S-010 of storing a selective authorization criterion for the subscriber in storage accessible to a policy control rules server 1, which is responsible for generating control rules based on service information received from an application device. The selective authorization criterion is selectable from a group of selective authorization criteria that may include: service incompatibilities, subscribed bandwidth QoS per subscriber, pre-emption priority value per each service allowable for each subscriber, and combinations thereof.

In one embodiment of the invention especially advantageous where service incompatibilities may be handled separately from the combination of subscribed bandwidth QoS per subscriber and pre-emption priority value per each service, for example, by handling service incompatibilities as part of the service logic for each service, the selective authorization criterion for a subscriber may be simply configured from: the subscribed bandwidth QoS for the subscriber and the pre-emption priority value per each service allowable for said subscriber.

As anticipated above, this step S-010 of storing each selective authorization criterion per subscriber might be carried out during configuration of the policy control rules server 1 via an external provisioning system not shown in any drawing. Alternatively, and especially adapted to telecommunication networks whose operators want centralized nodes handling subscriptions data for their subscribers, this step S-010 of storing each selective authorization criterion per subscriber may include a step of receiving from a subscription profile repository "SPR" 4, which holds subscription information for subscribers of the telecommunication network, either the selective authorization criterion applicable per subscriber, or any selective authorization criteria selected from: service incompatibilities, subscribed bandwidth QoS per subscriber, pre-emption priority value per each service allowable for each subscriber, and combinations thereof for a plurality of subscribers. This submission of selective authorization criteria a subscription profile repository "SPR" 4 being likely carried out upon query from the policy control rules server 1, or during any set-up procedures carried out at the subscription profile repository 4 or at the policy control rules server 1.

To this end, in accordance with a second aspect of the present invention there is provided a policy control rules server 1 as illustrated in FIG. 4. This policy control rules server 1 includes a storage 13, which in particular may be a database "Db", arranged for storing a selective authorization criterion per subscriber, wherein this selective authorization criterion may be selected from a group of selective authorization criteria that includes: service incompatibilities, subscribed bandwidth QoS per subscriber, pre-emption priority value per each service allowable for each subscriber, and combinations thereof. In one embodiment of the invention, this storage may be adapted for storing selective authorization criteria simply configured from: the subscribed bandwidth QoS for the subscriber and the pre-emption priority value per each service allowable for said subscriber. Moreover, the policy control rules server 1 also includes a receiver 12 which may be arranged for receiving each selective authorization criterion applicable per subscriber, or any selective authorization criteria described above, from the subscription profile repository 4. In this respect, the receiver may be adapted to support a particular interface I-30 for communication with the subscription profile repository 4, or the database itself may be provided with such particular interface I-30. Furthermore, even though not illustrated in any drawing, the policy control rules server 1 may include the subscription profile repository 4, or relevant parts thereof, as storage 13 for storing the selective authorization criterion per subscriber. Still further, where the policy control rules server 1 is configured with a selective authorization criterion per subscriber, the policy control rules server 1 may include a configuration unit 14 for storing the selective authorization criterion per subscriber in storage 13 either as pre-configured in the configuration unit 14 or as received from an external provisioning system not shown in any drawing.

At this stage, and whilst there are enough network resources available for a given subscriber, a number of service authorization requests may be allowed for the subscriber, each service being assigned the required resources and consuming a certain bandwidth QoS. Once the available resources and bandwidth QoS have been consumed by previous service authorization requests, a subsequent service authorization request may be received whilst there are no more available resources. The handling of this situation, and its progression to further situations, is illustrated in FIGS. 2a, 2b, and 2c.

In this respect, FIG. 2a exemplary illustrates the reception at the policy control rules server 1 from the application device 3b during step S-015 of one of these previous service authorization requests for the subscriber still encountering available resources. This one, as each service authorization request, may include in accordance with the invention service information indicating associated media required for the service and bandwidth QoS required for the associated media. Upon reception of a service authorization request, the method carries up a step S-020 of applying the selective authorization criterion for the service at the policy control rules server 1. For example, where the selective authorization criterion includes service incompatibilities, the authorization of this service might imply other services previously authorized and running to be inactivated; or, where service incompatibilities do not apply or are not included in the selective authorization criterion, other combinations of subscribed bandwidth QoS per subscriber and pre-emption priority value per each service allowable for each subscriber are taken into account.

In this case, the application of the selective authorization criterion for this exemplary previous service authorization requests for the subscriber does not require inactivation of other previous services and still encounters available resources. Then, the method includes a step S-025 of generating control rules for this exemplary service authorization request. These control rules may, in particular, include policy rules and charging rules as well as combinations thereof sufficiently known by those skilled in the art of a PCC architecture as defined by 3GPP Technical Specifications as well as other rules related with the control of network resources in the traffic plane. Once the control rules for the service are generated, a step S-030 of installing said control rules at a policy enforcement device 2, which is in charge of installing control rules received from the policy control rules server 1 in order to guarantee a bandwidth Quality of Service "QoS" for media associated with authorized services, takes place. A confirmation from the policy enforcement device 2 may be received in the policy control rules server 1 indicating that the control rules were successfully installed, being now active and operative. The policy control rules server 1, after having submitted the control rules for installation or after receiving the confirmation of being active, submits during a step S-040 towards the application device which had requested authorization for the service a corresponding authorization response indicating that execution of such service is authorized.

To this end, as illustrated in FIG. 4, the receiver 12 of the policy control rules server 1 is arranged for receiving from application devices 3, 3a, 3b, 3c a number of service authorization requests for a subscriber, each service authorization request respectively indicating associated media and bandwidth QoS required for the associated media. Besides, the policy control rules server includes a processor 10 for authorizing service authorization requests and for generating respective control rules for the service authorization requests; and a sender 11 arranged for submitting towards the application devices respective authorization responses for the service authorization requests, and for submitting towards the policy enforcement device 2 respective control rules. In an embodiment, the processor 10 may include an authorizer 101 for authorizing service authorization requests and a rules generator 102 for generating respective control rules for the service authorization requests. In another embodiment, the authorizer 101 and the rules generator 102 are provided as dedicated entities rather than included in a processor 10.

Also to this end, in accordance with a third aspect of the present invention, there is provided a policy enforcement device 2 as illustrated in FIG. 5. This policy enforcement device 2 includes a receiver 22 arranged for receiving from the policy control rules server 1 control rules to apply for media associated with an authorized service, the control rules indicating the associated media and bandwidth QoS required for the associated media; storage 23 for storing a number of control rules to be respectively applied to the media associated with a number of authorized services; and a processor 20 for installing the control rules, for distinguishing media transported in a bearer per authorized service basis, for applying the control rules applicable to each media and for controlling the bandwidth QoS consumed by each media. In an implementation of the invention, the processor 20 may include an inspector 201 for distinguishing the media transported in the bearer and a controller 202 for applying the control rules and for controlling the consumed bandwidth QoS. In another implementation, the inspector 201 and the controller 202 are provided as dedicated entities rather than included in the processor 20.

In accordance with a fourth aspect of the invention, cooperating with the above policy control rules server 1 and policy enforcement device 2 and also to this end, there is provided a number of application device 3, 3*a*, 3*b*, 3*c*, which in particular may be used as integral parts of, or in co-operation with, Application Function "AF" nodes in accordance with 3GPP Technical Specification "TS" 23.203, for submitting towards the above policy control rules server 1 service information for a service that require control of bearer resources. Each application device having a sender 31 arranged for submitting towards the policy control rules server 1 a number of service authorization requests for a subscriber, each service authorization request respectively indicating associated media and bandwidth QoS required for the associated media; and a receiver 32 arranged for receiving from the policy control rules server 1 authorization responses for the service authorization requests.

Also in particular, an application device 3*a*, 3*b*, 3*c* may respectively be used as an integral part of, or in co-operation with, a P-CSCF 81 node or with an exemplary Application Server "AS" 61 in accordance with a so-called 3GPP IP Multimedia Subsystem "IMS", or with an IPTV-AS 62, they all communicating with the policy control rules server 1 via a generic or proprietary interface I-10, as the case may be and as illustrated in FIG. 1. Likewise, the policy enforcement device 2 may be used as an integral part of, or in co-operation with, a GGSN 91 where the IP-CAN is a GPRS network as illustrated in FIG. 7, or a PDG 71 where the IP-CAN is WLAN network as illustrated in FIG. 8, both GGSN and PDG communicating with the policy control rules server 1 via a generic or proprietary interface I-20, as the case may be and as illustrated in FIGS. 1, 7 and 8.

The exemplary method for conflict resolution continues with the sequence of actions illustrated in FIG. 2*b*, wherein another application device 3*a* submits a subsequent service authorization request to the policy control rules server 1 during a step S-045. As for the previous ones, this subsequent service authorization request includes service information indicating associated media and bandwidth QoS required for the associated media. Then, the method includes at the policy control rules server 1 a step S-050 of applying the selective authorization criterion for this subsequent service authorization request. In this case, the application of the selective authorization criterion for this subsequent service authorization request for the subscriber may result on other services previously authorized and running to be inactivated. For example, where the selective authorization criterion includes service incompatibilities; or, where the subscribed bandwidth QoS stored for the subscriber would be exceeded if execution of this subsequent service is authorized with the received bandwidth QoS required for its associated media, a next step S-055 may be carried out to select those previously authorized services still running to be inactivated. For the former exemplary reason for inactivation, the service incompatibilities may include identifiers of the services to be inactivated; whereas for both reasons for inactivation, the step S-055 of selecting those previously authorized services to be inactivated may take into account the pre-emption priority value of all previously authorized services still running.

In accordance with the invention, the policy control rules server 1 selects during the step S-055 those previously authorized services to be put on hold, that is, to be temporary inactivated, rather than definitely terminating any previously authorized services and withdrawal of respective control rules. To this end, as FIG. 4 illustrates, the processor 10 of the policy control rules server 1 is arranged for selecting amongst the previously authorized services those which may be inactivated as a result of applying the selective authorization criterion for the subscriber, and for putting on hold the selected previously authorized services. In the above preferred implementation, the authorizer 101 included in the processor 10 is arranged for putting on hold the selected previously authorized services. Also in an embodiment of the invention, the processor 10 may include a selector 103 for selecting amongst the previously authorized services those which may be inactivated as a result of applying the selective authorization criterion for the subscriber; whereas in another embodiment, the selector 103 is provided as a dedicated entity rather than included in the processor 10.

In particular, where the subscribed bandwidth QoS appears as a reason for inactivation of previously authorized services, and in accordance with an embodiment of the invention, the step S-055 of selecting amongst the previously authorized services those which may be inactivated may include a step (not shown in any drawing) of determining a cumulative bandwidth QoS as the total sum of bandwidth QoS consumed by the media associated with the previously authorized services plus the bandwidth QoS required for the subsequent service, the cumulative bandwidth QoS exceeding the subscribed bandwidth QoS; and a step of fetching amongst the previously authorized services those with lower pre-emption priority value than the subsequent service and, amongst these, those which consumed bandwidth QoS, discounted alone or in combination from the cumulative bandwidth QoS, make the cumulative bandwidth QoS lower than the subscribed bandwidth QoS for the subscriber. These fetched previously authorized services with lower pre-emption priority value are selected to be put on hold so that respective consumed resources can be available for the subsequent service with a higher pre-emption priority value. Also in particular and, where applicable, preferably carried out prior than checking whether the subscribed bandwidth QoS allows authorization of the subsequent service, the step S-055 of selecting amongst the previously authorized services those which may be inactivated may include a step of determining amongst the previously authorized services those having service incompatibilities in the selective authorization criterion.

To this end, as illustrated in FIG. 4, the processor 10 of the policy control rules server 1 may include an arithmetical unit 1031 for determining the cumulative bandwidth QoS as the total sum of bandwidth QoS consumed by the media associated with the previously authorized services plus the bandwidth QoS required for the subsequent service, this cumulative bandwidth QoS exceeding the subscribed bandwidth QoS in the present exemplary case; and search means 1032 for fetching amongst the previously authorized services those with lower pre-emption priority value than the subsequent service and, amongst these, those which consumed bandwidth QoS, discounted alone or in combination from the cumulative bandwidth QoS, make the cumulative bandwidth QoS lower than the subscribed bandwidth QoS for the subscriber. Moreover, the processor 10 of the policy control rules server 1 may also include a compatibility module 1033 for determining amongst the previously authorized services those having service incompatibilities in the selective authorization criterion. In an embodiment commented above, where the processor 10 includes the selector 103 for selecting amongst the previously authorized services those which may be inactivated as a result of applying the selective authorization criterion for the subscriber, any of these components: arithmetical unit 1031, search means 1032 and compatibility module 1033, alone or in combination, may be included as integral parts of this selector 103; whereas in another embodiment they may be included as integral parts of the processor 10.

Back to the exemplary method and still with reference to the actions illustrated in FIG. 2*b*, and once previously authorized services are selected to be put on hold, there is provided in accordance with this method a step S-060 of submitting from the policy control rules server 1 towards the application device 3*b*, which had requested the authorization and is thus in charge of such previous services, a notification indicating those selected one or more previously authorized services to be put on hold; and a step S-080 of receiving at the policy enforcement device 2 a notification intended to put on hold respective control rules for the one or more previously authorized services. These two steps admit some alternative embodiments. In particular, this notification submitted from the policy control rules server 1 towards the application device 3*b* may include a reason code indicating a 'lack/loss of resources' or 'pre-empted on-hold', where the subscribed bandwidth QoS was exceeded, or another reason code indicating 'service incompatibility', where this was the reason to put on hold those selected one or more previously authorized services.

In one embodiment of the invention, the step S-080 of receiving at the policy enforcement device 2 the notification intended to put on hold respective control rules for the one or more previously authorized services may include a step of submitting such notification from the policy control rules server 1. This submission from the policy control rules server 1 may be responsive to a confirmation received from the application device 3*b* during step S-075 to put on hold the selected one or more previously authorized services, or it may be triggered from the policy control rules server 1 without expecting any confirmation, where both policy control rules server 1 and application device 3*b* are thus configured to this end. In fact, the confirmation submitted from the application device 3*b* may be unnecessary where the policy control rules server 1 submits the notification intended to put on hold respective control rules for the one or more previously authorized services towards the policy enforcement device 2 on its own without waiting for such confirmation.

For those selected previously authorized services affected by the decision to be put on hold, the policy control rules server 1 may take different actions towards the access network, in particular, towards the policy enforcement device 2. Where the reason for being put on hold was based on a lack of resources, namely exceeding the subscribed bandwidth QoS, resources have to be released in the access network. This may be done by setting the respective control rules also 'on hold', that is, 'temporary inactive' in the policy enforcement device 2. This status is interpreted so that the control rules are kept in the policy enforcement device 2 but, since they are not currently used therein, no resource is consumed, and related resources are not considered to be reserved any longer. However, this status 'on hold' does not result in a bearer release. Moreover, in some particular cases, it may be advantageous to keep a suitable bearer, and some associated control rules active in order to permit and handle some control traffic associated with the media for services on hold. On the other hand, where the reason for being put on hold was based on any other cause that has no consequence on the resource reservation, such as service incompatibility, there is no need to release resources, but simply modifying the respective control rules to make them temporary inoperative, or inactivated.

In another embodiment of the invention, the step S-080 of receiving at the policy enforcement device 2 the notification intended to put on hold respective control rules for the one or more previously authorized services may include a step (not shown in any drawing) of submitting such notification directly from the application device 3*b* in charge of such one or more previously authorized services towards the policy enforcement device 2.

On the other hand, the confirmation submitted from the application device 3*b* during step S-075 as well as the notification submitted directly from the application device 3*b* towards the policy enforcement device 2 may be subject to alternative embodiments. In one embodiment, such confirmation or such notification may be submitted as an initiative of the application device itself, whereas in another embodiment such confirmation or such notification may be responsive to a successful response obtained upon request during steps S-065 and S-070 from the user equipment 5*a* presently used by the subscriber. Moreover, and specially applicable to the case where the application device 3*b* is included in a P-CSCF 81 of an IMS network, such confirmation or such notification may be responsive to respective successful responses obtained from the user equipment 5*a*, which the P-CSCF is serving, and from another communicating peer, such as a user equipment 5*b* illustrated in FIG. 7 and in use by another end subscriber or such as another application service 3*c* serving the user equipment 5*a*, which in particular may be located in, or integrated with, an IPTV-AS 62.

To this end, as illustrated in FIG. 4, the sender 11 of the policy control rules server 1 is arranged for submitting towards each respective application device 3*b* a notification indicating those selected previously authorized services to be put on hold; and, where both policy control rules server 1 and application device 3*b* are configured so that the confirmation from the application device is required, the receiver 12 of the policy control rules server 1 is further arranged for receiving from each respective application devices a confirmation intended to put on hold the selected previously authorized services. Moreover, the sender 11 of the policy control rules server 1 may be further arranged for submitting the notification intended to put on hold respective control rules for those selected previously authorized services towards the policy enforcement device 2, where both policy control rules server 1 and application device 3b have been thus configured to this end. Furthermore, this notification intended to put on hold respective control rules for those selected previously authorized services submitted from the sender 11 of the policy control rules server 1 towards the policy enforcement device 2 may be responsive to the above confirmation to put on hold the selected previously authorized services received from the application device 3b.

Aligned and co-operating with the above policy control rules server 1 also to this end, each application device 3a, 3b, 3c illustrated in FIG. 6 is implemented so that its receiver 32 is further arranged for receiving from the policy control rules server 1 a notification indicating one or more previously authorized services to be put on hold; and, where both policy control rules server 1 and application device 3b are configured so that the confirmation from the application device is required, the sender 31 of the application device is further arranged for submitting such confirmation towards the policy control rules server 1 intended to put on hold the one or more previously authorized services. On the other hand, where the above embodiment of submitting the notification intended to put on hold respective control rules for the one or more previously authorized services directly from the application device 3b towards the policy enforcement device 2 is the preferred one, the sender 31 of the application device may be further arranged for submitting such notification towards the policy enforcement device 2. In an alternative embodiment, the sender 31 may be adapted to submit both confirmation and notification.

On the other hand, where the confirmation submitted from the application device 3b towards the policy control rules server 1 or where the notification submitted directly from the application device 3b towards the policy enforcement device 2, as the case may be, is responsive to a successful response from the user's equipment in use by the subscriber, the sender 31 of the application device may be further arranged for submitting towards the user's equipment 5a a notification indicating the one or more previously authorized services to be put on hold whilst the indicated subsequent service is running; and the receiver 32 may be further arranged for receiving from the user's equipment 5a the corresponding successful response.

To this end, and in accordance with a fifth aspect of the invention, the user equipment 5a, usable by the subscriber, is equipped with a receiver arranged for receiving from the application device 3b a notification indicating the one or more previously authorized services to be put on hold, whilst a subsequent service is running, and with a sender arranged for submitting towards the application device 3b a corresponding successful response.

Aligned and co-operating with the above policy control rules server 1 and application device 3b, and also to this end, the policy enforcement device 2 illustrated in FIG. 5 is implemented so that its receiver 22 is arranged for receiving the notification intended to put on hold respective control rules for one or more previously authorized services from the policy control rules server 1, in accordance with an embodiment of the invention, or from the application device 3b, in accordance with another embodiment of the invention.

Upon receipt of the notification intended to put on hold respective control rules for one or more previously authorized services in step S-080, the method of conflict resolution continues with the sequence of actions illustrated in FIG. 2c, wherein the policy enforcement device 2 inactivates during step S-085 the respective control rules for the one or more previously authorized services as indicated in the notification, and eventually confirms towards the policy control rules server 1 such inactivation during step S-090.

To this end, the policy enforcement device 2 illustrated in FIG. 5 is implemented so that its processor 20 is further arranged for inactivating those control rules applicable to the media associated with said one or more previously authorized services. In one of the above embodiments, this processor 20 may include a holder 203 for carrying out this inactivation of control rules and, whereas in another embodiment the holder 203 may be provided as a dedicated entity rather than included in a processor 20. The holder 203 or the processor 20, as the case may be, and in order to facilitate any eventual re-activation, may be further arranged for keeping the inactivated control rules in the storage 23.

The policy control rules server 1 confirmed of such inactivation, as illustrated in FIG. 2c during step S-090, may assume that there are available resources to be assigned for the subsequent service, whose authorization is still pending, and carries out a step S-100 of generating control rules for this pending subsequent authorization request, which was received from the application device 3a during the step S-045 illustrated in FIG. 2b. As for previously authorized services, the flow in FIG. 2c continues with a step S-110 of submitting for installation the new control rules generated for the subsequent service from the policy control rules server 1 towards the policy enforcement device 2, and with a step S-115 of receiving a confirmation at the policy control rules server 1 from the policy enforcement device 2 that the control rules have been successfully installed and are active. Then, the policy control rules server 1 may submit towards the application device 3a, which is in charge of this subsequent service, an authorization response for the subsequent authorization request authorizing the service. To this end, as for the previous authorization requests, either the processor 10 of the policy control rules server 1, or the authorizer 101, may be arranged for authorizing this subsequent service authorization request; and either the processor 10 of the policy control rules server 1, or the rules generator 102, may be arranged for generating the control rules for this subsequent authorization request.

At this stage, the method for conflict resolution has provided a number of steps to put on hold, rather than terminating, previously authorized services in order to allow the assignation of resources for a subsequent service, likely with a higher pre-emption priority value or with incompatibilities with the previous services or both. In the following, additional exemplary and alternative steps of a method of re-activating these previously authorized services still on hold are provided to be applied depending on different reasons.

An exemplary reason making some previously authorized services still on hold to be re-activated may be an increase of the subscribed bandwidth QoS for the subscriber, either from a provisioning system by administrative means, or from the SPR 4, or by other means. Another exemplary reason making some previously authorized services still on hold to be re-activated may be the termination of any service, other than those on hold, what would imply more resources would be available and might be used to re-activate any service on hold.

This method of re-activating these previously authorized services still on hold may be provided to complement the previous method of conflict resolution and, even though different reasons may trigger the conditions for re-activation of previously authorized services still on hold, some steps may be commonly carried out independently of the reasons.

Thus, the method illustrated in FIG. 3a starts with an exemplary step S-130 of receiving at the policy control rules server 1 a termination request for a service other than a previously authorized service still on hold. As already commented above, other reasons might trigger the application of this method such as a step of determining a pre-arranged termination for a service in the policy control rules server 1 without such request from any application device, or a step of increasing the subscribed bandwidth QoS for the subscriber.

Then, the policy control rules server 1 applies during a step S-135 the selective authorization criterion for services still on hold and selects during a step S-140, amongst the previously authorized services still on hold, those which may be activated as a result of applying said selective authorization criterion. Once one or more previously authorized services still on hold are selected to be activated, the policy control rules server 1 submits towards the application device 3b, which is in charge of such services on hold, a notification during a step S-145 indicating the selected one or more previously authorized services, still on hold, to be activated; whilst both policy control rules server 1 and application device 3b activate these selected one or more previously authorized services still on hold.

In particular, this notification indicating the selected one or more previously authorized services still on hold and to be activated, submitted from the policy control rules server 1 towards the application device 3b, may include a reason code indicating 'recovery of resources', where the reason to put them on hold was 'lack/loss of resources' or 'pre-empted on-hold', or a reason code indicating "compatibility", where the reason to put them on hold was 'service incompatibility'.

To this end, where the subscribed bandwidth QoS for the subscriber is increased or where an authorized service, other than the previously authorized services still on hold, is terminated, and with reference to the policy control rules server 1 illustrated in FIG. 4, the processor 10 or the selector 103, as the case may be, is further arranged for selecting, amongst the previously authorized services still on hold, those which may be activated as a result of applying the selective authorization criterion for the subscriber; also the processor 10 or the authorizer 101, as the case may be, is further arranged for activating these selected previously authorized services still on hold; and the sender 11 is further arranged for submitting towards the application device 3b a notification indicating said selected previously authorized services, still on hold, to be activated.

Aligned and co-operating with the policy control rules server 1 and also to this end, the receiver 32 of the application device illustrated in FIG. 6 is further arranged for receiving from the policy control rules server 1 a notification indicating the one or more previously authorized services, still on hold, to be activated. As for the case where previously authorized services were put on hold, both policy control rules server 1 and application device 3b may be configured for confirming services activated or on hold. To this end, the sender 31 of the application device is further arranged for submitting towards the policy control rules server 1 a confirmation indicating the one or more previously authorized services, still on hold, to be activated. Moreover, this confirmation may be triggered from the application device on its own or responsive to a successful response from the user's equipment 5a currently in use by the subscriber. Where the latter applies, the sender 31 may be further arranged for submitting towards the user's equipment 5a a notification indicating the one or more previously authorized services still on hold and to be activated; and the receiver 32 may be thus further arranged for receiving from the user's equipment 5a the corresponding successful response.

For example, where one or more previously authorized services were put on hold by applying a selective authorization criterion that included service incompatibilities, and the subsequent service causing such service incompatibilities is terminated, the previously authorized services still on hold might be re-activated. Therefore, the step S-140 of selecting, amongst the previously authorized services on hold, those which may be activated includes a step (not shown in any drawing) of determining, amongst the previously authorized services still on hold, those which may be activated as a result of applying service incompatibilities in the selective authorization criterion. To this end, and with reference to the policy control rules server 1 illustrated in FIG. 4, the processor 10 or the selector 103, as the case may be, may further include a compatibility module 1033 for determining amongst the previously authorized services still on hold those which may be activated as a result of applying service incompatibilities in the selective authorization criterion.

Also for example, where one or more previously authorized services were put on hold by applying a selective authorization criterion due to exceeding the subscribed bandwidth QoS for the subscriber, the previously authorized services still on hold might be re-activated as a consequence of carrying out a step of increasing the subscribed bandwidth QoS for said subscriber or as a consequence of terminating a subsequent service consuming enough bandwidth QoS for said service. Therefore, the step S-140 of selecting, amongst the previously authorized services on hold, those which may be activated includes a step (not shown in any drawing) of determining a cumulative bandwidth QoS as the total sum of bandwidth QoS consumed by the media associated with currently authorized services, other than the previously authorized services still on hold, the subscribed bandwidth QoS exceeding the cumulative bandwidth QoS; and a step of fetching amongst the previously authorized services still on hold those with higher pre-emption priority value and, amongst these, those which consumed bandwidth QoS, added alone or in combination to the cumulative bandwidth QoS, still make the cumulative bandwidth QoS lower than the subscribed bandwidth QoS for the subscriber. To this end, and with reference to the policy control rules server 1 illustrated in FIG. 4, the processor 10 or the selector 103, as the case may be, may further include an arithmetical unit 1031 for determining a cumulative bandwidth QoS as the total sum of bandwidth QoS consumed by the media associated with currently authorized services, other than the previously authorized services still on hold, the subscribed bandwidth QoS exceeding the cumulative bandwidth QoS; and search means 1032 for fetching amongst the previously authorized services still on hold those with higher pre-emption priority value and, amongst these, those which consumed bandwidth QoS, added alone or in combination to the cumulative bandwidth QoS, still make the cumulative bandwidth QoS lower than the subscribed bandwidth QoS for the subscriber.

Again with reference to the exemplary method illustrated in FIG. 3a, and once the policy control rules server 1 has submitted towards the application device 3b during a step S-145 the notification indicating the selected one or more previously authorized services, still on hold, to be activated, the method may comprise a step S-175 illustrated on FIG. 3b of receiving at the policy enforcement device 2 a notification intended to activate respective control rules for the selected one or more previously authorized services still on hold. In this respect, and with reference to the embodiment illustrated in FIGS. 3a and 3b, this notification submitted towards the policy enforcement device 2 may be responsive to a confirmation received at the policy control rules server 1 from the application device 3b intended to activate the selected one or more previously authorized services still on hold, or may be triggered by the policy control rules server 1 without waiting for such confirmation. In another embodiment not shown in any drawing, the notification received in step S-175 at the policy enforcement device 2 may be submitted directly from the application device 3b without passing through the policy control rules server 1.

An advantage of submitting the notification intended to activate respective control rules for the selected one or more previously authorized services still on hold, as well as the above notification intended to put on hold respective control rules for the selected one or more previously authorized services, from the policy control rules server 1 towards the policy enforcement device 2, is that the policy control rules server 1 is the one which had generated the control rules and can thus indicate them without referring to one or more previously authorized services, as the application device can do, so that the control rules installed at the policy enforcement device 2 do not need to be correlated with said respective one or more previously authorized services.

Aligned with a previous embodiment described above with reference to FIGS. 2a, 2b and 2c, and intended to put on hold selected one more previously authorized services, the confirmation intended to activate the selected one or more previously authorized services still on hold, which is submitted from the application device 3b towards the policy control rules server 1, may be responsive to a successful response from a user's equipment 5a in use by the subscriber. Thus the method includes, as illustrated in FIG. 3a, a step S-150 of submitting towards the user's equipment 5a a notification indicating the one or more previously authorized services still on hold to be activated; and a step S-155 of receiving from the user's equipment 5a the corresponding successful response.

To this end, as illustrated in FIG. 4, the receiver 12 of the policy control rules server 1 may be further arranged for receiving from each respective application devices a confirmation intended to activate the selected one or more previously authorized services still on hold. Moreover, the sender 11 of the policy control rules server 1 may be further arranged for submitting the notification intended to activate respective control rules for those selected one or more previously authorized services still on hold towards the policy enforcement device 2, where both policy control rules server 1 and application device 3b have been thus configured to this end. Furthermore, this notification intended to activate respective control rules, submitted from the sender 11 of the policy control rules server 1 towards the policy enforcement device 2, may be responsive to the above confirmation received from the application device 3b.

Aligned and co-operating with the above policy control rules server 1 and also to this end, the application device 3b illustrated in FIG. 6 may be implemented so that, where both policy control rules server 1 and application device 3b are configured to expect a confirmation from the application device, the sender 31 of the application device may be further arranged for submitting a confirmation intended to activate the one or more previously authorized services still on hold towards the policy control rules server 1. On the other hand, where the above embodiment of submitting the notification intended to activate respective control rules for the one or more previously authorized services still on hold, directly from the application device 3b towards the policy enforcement device 2, is the preferred one, the sender 31 of the application device may be further arranged for submitting such notification towards the policy enforcement device 2. In an alternative embodiment, the sender 31 may be adapted to submit both confirmation and notification.

On the other hand, where the confirmation submitted from the application device 3b towards the policy control rules server 1, or where the notification submitted directly from the application device 3b towards the policy enforcement device 2, as the case may be, is responsive to a successful response from the user's equipment in use by the subscriber, the sender 31 of the application device may be further arranged for submitting towards the user's equipment 5a a notification indicating the one or more previously authorized services still on hold and to be activated; and the receiver 32 may be further arranged for receiving from the user's equipment 5a the corresponding successful response.

To this end, and in accordance with the fifth aspect of the invention, the receiver of the user equipment 5a usable by the subscriber is arranged for receiving from the application device 3b a notification indicating the selected one or more previously authorized services still on hold and to be activated, and the sender of the user equipment 5a is arranged for submitting towards the application device 3b a corresponding successful response.

Aligned and co-operating with the above policy control rules server 1 and application device 3b, and also to this end, the policy enforcement device 2 illustrated in FIG. 5 is implemented so that its receiver 22 is arranged for receiving the notification intended to activate respective control rules for one or more previously authorized services still on hold from the policy control rules server 1, in accordance with an embodiment of the invention, or from the application device 3b, in accordance with another embodiment of the invention.

Once the policy enforcement device 2 has received in step S-175 a notification intended to activate respective control rules for the selected one or more previously authorized services still on hold, as illustrated in FIG. 3b, the method includes a further step S-180 of activating at the policy enforcement device 2 those control rules applicable to the media associated with said selected one or more previously authorized services still on hold. Then, the policy enforcement device 2 may further confirm towards the policy control rules server 1 such activation of control rules which were on hold during a step S-190.

To this end, the policy enforcement device 2 illustrated in FIG. 5 is implemented so that its holder 203 is arranged for activating these respective control rules applicable to the media associated with said one or more previously authorized services still on hold. Moreover, in order to confirm such activation, the policy enforcement device 2 may further include a sender 21 arranged for confirming towards the policy control rules server 1 such activation of control rules which were on hold.

At any time during this method any service, which is active or on hold, may be terminated, such as the occurrence explained above during the exemplary step S-130 of receiving at the policy control rules server 1 a termination request for a service other than a previously authorized service still on hold. Where a service, either active or on hold, is terminated from the application device, such as during step S-130, a termination request is submitted towards the policy control rules server 1. Nevertheless, there may be other services with a sort of pre-arranged end, which may be terminated by the policy control rules server 1 on its own without participation of any application device.

For those services terminated from the application devices, the sender 31 of any application device 3a, 3b, 3c may be further arranged for submitting a termination request intended to terminate any authorized service, on hold or activated, towards the policy control rules server 1.

To this end and cooperating with the application device, the policy control rules server 1 may be implemented so that the receiver 12 may be further arranged for receiving from the application device 3a, 3b, 3c a termination request intended to terminate the authorized service; the authorizer 101 may be further arranged for terminating the authorized service; and the sender 11 may be further arranged for submitting towards the policy enforcement device 2 a termination request intended to terminate the control rules for the authorized service.

To this end and cooperating with the application device 3a, 3b, 3c and with the policy control rules server 1, the policy enforcement device 2 may be implemented so that the receiver 22 may be arranged for receiving from the policy control rules server 1 a service termination request intended to terminate the control rules for the authorized service; and the controller 202 may be further arranged for removing the corresponding control rules from storage, for releasing those resources consumed by the terminated service, and for terminating the transporting bearer once no corresponding control rule remains in the storage.

In particular, the above policy control rules server 1 may be included as an integral part of, or in co-operation with, a Policy and Charging Rules Function "PCRF" node in accordance with 3GPP Technical Specification "TS" 23.203.

Also in particular, the above policy enforcement device 2 may be included as an integral part of, or in co-operation with, a Policy and Charging Enforcement Function "PCEF" node in accordance with 3GPP Technical Specification "TS" 23.203.

The invention also provides for a computer program, loadable into an internal memory of a computer with input and output units as well as with a processing unit, the computer program comprising executable software adapted to carry out method steps as described above when running in the computer, and wherein the executable software may be recorded in a carrier readable in a computer.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A policy enforcement device for installing policy control rules received from a policy control rules server in order to guarantee a bandwidth Quality of Service (QoS) for media associated with authorized services, the policy enforcement device comprising:
  a receiver arranged to receive from a policy control rules server policy control rules to apply for media associated with an authorized service, the policy control rules indicating the associated media and bandwidth QoS required for the associated media, the receiver being arranged to receive a notification to put on hold respective policy control rules for one or more previously authorized services;
  storage arranged to store a plurality of policy control rules to be respectively applied to the media associated with a plurality of authorized services, each of the authorized services being associated in the storage with a set of one or more of the policy control rules that are applicable respectively to media associated with the corresponding authorized service;
  an inspector arranged to distinguish the associated media transported in a bearer on a per authorized service basis;
  a controller arranged to apply each set of one or more policy control rules applicable respectively to each distinguished, associated media and to control the bandwidth QoS consumed by each distinguished, associated media; and
  a holder arranged to inactivate those policy control rules notified to be put on hold and applicable to the media associated with said one or more previously authorized services.

2. The policy enforcement device of claim 1, wherein the holder is further arranged to keep the inactivated policy control rules in the storage.

3. The policy enforcement device of claim 1, wherein the receiver is arranged to receive the notification from the policy control rules server.

4. The policy enforcement device of claim 3, wherein the receiver is arranged to receive from the policy control rules server a notification to activate respective policy control rules for one or more previously authorized services still on hold; and the holder is arranged to activate these respective policy control rules applicable to the media associated with said one or more previously authorized services.

5. The policy enforcement device of claim 1, wherein the receiver is arranged to receive the notification from an application device involved in service negotiation and responsible for submitting service information towards the policy control rules server.

6. The policy enforcement device of claim 5, wherein the receiver is arranged to receive from the application device a notification to activate respective policy control rules for one or more previously authorized services still on hold; and the holder is arranged to activate these respective policy control rules applicable to the media associated with said one or more previously authorized services.

7. The policy enforcement device of claim 1, wherein the receiver is arranged to receive from the policy control rules server a service termination request to terminate the policy control rules for the authorized service, on hold or activated; and the controller is further arranged to remove the corresponding control rules from storage, to release those resources consumed by the terminated service, and to terminate the transporting bearer once no corresponding policy control rule remains in the storage.

8. A method for guaranteeing in a policy enforcement device service requirements negotiated for a service through an application device, the service requirements including a bandwidth Quality of Service (QoS) for media associated with the service, the method comprising the steps of:
  receiving at a policy control rules server, which is responsible for generating policy control rules based on service information received from application devices, a plurality of previous service authorization requests and a subsequent service authorization request for a subscriber from corresponding ones of the application devices, each service authorization request respectively including service information indicating associated media and bandwidth QoS required for the associated media;
  generating at the policy control rules server a set of one or more policy control rules for each of the previous and subsequent service authorization requests, each of the sets of one or more of the policy control rules being applicable respectively to media associated with the corresponding service authorization request;
  installing said respective policy control rules at a policy enforcement device;

submitting from the policy controls rules server towards the application devices respective authorization responses for the previous and subsequent service authorization requests;

storing in a storage accessible to the policy control rules server a selective authorization criterion per subscriber, the selective authorization criterion selected from service incompatibilities, subscribed bandwidth QoS per subscriber, preemption priority value per each service allowable for each subscriber, and combinations thereof;

the policy control rules server selecting amongst a plurality of previously authorized services corresponding to the previous service authorization requests those authorized services which may be inactivated as a result of applying the selective authorization criterion for the subscriber;

putting on hold the selected one or more previously authorized services;

submitting from the policy control rules server towards the application devices a notification indicating the selected one or more previously authorized services to be put on hold;

receiving at the policy enforcement device a notification to put on hold respective control rules for the selected one or more previously authorized services; and inactivating at a policy enforcement device those control rules applicable to the media associated with said selected one or more previously authorized services.

9. The method of claim 8, wherein the step of receiving at the policy enforcement device the notification to put on hold respective policy control rules for the one or more previously authorized services includes a step of submitting from the application devices towards the policy enforcement device a notification intended to put on hold respective control rules for the one or more previously authorized services.

10. The method of claim 8, wherein the step of receiving at the policy enforcement device the notification to put on hold respective policy control rules for the one or more previously authorized services includes a step of submitting from the policy control rules server towards the policy enforcement device a notification intended to put on hold respective policy control rules for the one or more previously authorized services.

11. The method of claim 8, further comprising a step of receiving at the policy control rules server from the application devices a confirmation intended to put on hold the selected one or more previously authorized services.

12. The method of claim 8, wherein the step of selecting amongst the previously authorized services those which may be inactivated includes a step of determining a cumulative bandwidth QoS as the total sum of bandwidth QoS consumed by the media associated with the previously authorized services plus the bandwidth QoS required for the subsequent service, the cumulative bandwidth QoS exceeding the subscribed bandwidth QoS; and a step of fetching amongst the previously authorized services those with lower pre-emption priority value than the subsequent service and, amongst these, those which consumed bandwidth QoS, discounted alone or in combination from the cumulative bandwidth QoS, make the cumulative bandwidth QoS lower than the subscribed bandwidth QoS for the subscriber.

13. The method of claim 8, wherein the step of selecting amongst the previously authorized services those which may be inactivated includes a step of determining amongst the previously authorized services those having service incompatibilities in the selective authorization criterion.

14. The method of claim 8, comprising further steps of:

selecting at the policy control rules server, amongst the previously authorized services still on hold, those which may be activated as a result of applying the selective authorization criterion for the subscriber;

submitting towards the application device a notification indicating the selected one or more previously authorized services, still on hold, to be activated;

activating at the policy control rules server and at the application device these selected one or more previously authorized services still on hold;

receiving at the policy enforcement device a notification intended to activate respective policy control rules for the selected one or more previously authorized services still on hold; and activating at the policy enforcement device those policy control rules applicable to the media associated with said selected one or more previously authorized services.

15. The method of claim 14, wherein these further steps are responsive to a previous step selected from a group of steps including:

increasing the subscribed bandwidth QoS for the subscriber; and terminating an authorized service, other than the previously authorized services still on hold.

16. The method of claim 14, wherein the step of selecting amongst the previously authorized services on hold those which may be activated includes a step of determining a cumulative bandwidth QoS as the total sum of bandwidth QoS consumed by the media associated with currently authorized services, other than the previously authorized services still on hold, the subscribed bandwidth QoS exceeding the cumulative bandwidth QoS; and a step of fetching amongst the previously authorized services still on hod those with higher pre-emption priority value and, amongst these, those which consumed bandwidth QoS, added alone or in combination to the cumulative bandwidth QoS, still make the cumulative bandwidth QoS lower than the subscribed bandwidth QoS for the subscriber.

17. The method of claim 14, wherein the step of selecting amongst the previously authorized services on hold those which may be activated includes a step of determining amongst the previously authorized services still on hold those which may be activated as a result of applying service incompatibilities in the selective authorization criterion.

18. The method of claim 8, further comprising a step of receiving from a subscription profile repository (SPR) holding subscription information for subscribers of a telecommunication network either the selective authorization criterion, or any selective authorization criteria selected from: service incompatibilities, subscribed bandwidth QoS per subscriber, pre-emption priority value per each service allowable for each subscriber, and combinations thereof.

* * * * *

UNITED STATES PATENT AND TRADEMARK OFFICE
CERTIFICATE OF CORRECTION

| | | |
|---|---|---|
| PATENT NO. | : 8,856,326 B2 | Page 1 of 1 |
| APPLICATION NO. | : 12/525225 | |
| DATED | : October 7, 2014 | |
| INVENTOR(S) | : Alonso et al. | |

It is certified that error appears in the above-identified patent and that said Letters Patent is hereby corrected as shown below:

In the Specification

In Column 3, Line 24, delete "teems of" and insert -- terms of --, therefor.

In Column 16, Line 56, delete "service 3c" and insert -- device 3c --, therefor.

In the Claims

In Column 26, Line 6, in Claim 14, delete "comprising further" and insert -- further comprising --, therefor.

In Column 26, Line 41, in Claim 16, delete "hod those" and insert -- hold those --, therefor.

Signed and Sealed this
Twelfth Day of May, 2015

Michelle K. Lee
*Director of the United States Patent and Trademark Office*